(12) United States Patent
Jung et al.

(10) Patent No.: US 9,420,451 B2
(45) Date of Patent: Aug. 16, 2016

(54) METHOD FOR LIMITED POSITIONING-BASED REPORTING IN WIRELESS COMMUNICATION SYSTEM AND APPARATUS THEREFOR

(71) Applicant: LG ELECTRONICS INC., Seoul (JP)

(72) Inventors: Sung Hoon Jung, Anyang-si (KR); Sung Jun Park, Anyang-si (KR); Jae Wook Lee, Anyang-si (KR); Young Dae Lee, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/374,169

(22) PCT Filed: Jan. 29, 2013

(86) PCT No.: PCT/KR2013/000710
§ 371 (c)(1),
(2) Date: Jul. 23, 2014

(87) PCT Pub. No.: WO2013/112031
PCT Pub. Date: Aug. 1, 2013

(65) Prior Publication Data
US 2014/0370915 A1  Dec. 18, 2014

Related U.S. Application Data

(60) Provisional application No. 61/591,992, filed on Jan. 29, 2012.

(51) Int. Cl.
*H04W 8/22* (2009.01)
*H04W 64/00* (2009.01)
(Continued)

(52) U.S. Cl.
CPC .. *H04W 8/22* (2013.01); *G01S 5/00* (2013.01); *G01S 5/0027* (2013.01); *H04W 4/02* (2013.01); *H04W 64/00* (2013.01)

(58) Field of Classification Search
None
See application file for complete search history.

(56) References Cited

U.S. PATENT DOCUMENTS 7,224,987 B1 * 5/2007 Bhela ............... G06Q 30/02
455/456.1
7,336,963 B1 * 2/2008 Rayburn ............ H04W 4/12
370/469

(Continued)

FOREIGN PATENT DOCUMENTS

JP  2011-238990 A  11/2011
KR  10-0559284 B1  4/2001

(Continued)

OTHER PUBLICATIONS

NTT Docomo, Inc., MediaTek, Vodafone, CMCC: "Requirements, Priority and Solution for MDT Location Information Enhancement", 3GPP TSG-RAN2#76, R2-116135, Nov. 14-18, 2011.

(Continued)

*Primary Examiner* — Ashish K Thomas
(74) *Attorney, Agent, or Firm* — Dentons US LLP

(57) ABSTRACT

Provided is a method for reporting by a terminal in a wireless communication system. The method comprises: receiving positioning-limiting information from a network; and determining whether to allow positioning on the basis of the positioning limiting information. The method additionally comprises, if the positioning is allowed, acquiring location information by means of positioning, and reporting the location information via a network.

13 Claims, 23 Drawing Sheets

(51) Int. Cl.
*G01S 5/00* (2006.01)
*H04W 4/02* (2009.01)

(56) References Cited

U.S. PATENT DOCUMENTS

| | | | | |
|---|---|---|---|---|
| 7,477,903 B2* | 1/2009 | Wilcock | ................ | G01S 5/0226 340/988 |
| 7,860,517 B1* | 12/2010 | Patoskie | ................ | H04W 4/028 340/426.19 |
| 7,917,153 B2* | 3/2011 | Orwant | ................ | H04W 4/12 455/404.2 |
| 8,036,679 B1* | 10/2011 | Barbeau | ................ | H04W 4/02 340/539.13 |
| 8,712,438 B1* | 4/2014 | McMullen | ............. | H04M 3/42 342/457 |
| 2010/0234038 A1* | 9/2010 | Thandu | ................ | G01S 19/34 455/450 |
| 2011/0201279 A1* | 8/2011 | Suzuki | ................ | H04W 24/10 455/67.11 |
| 2012/0309431 A1* | 12/2012 | Bodog | ................ | H04W 16/18 455/456.6 |
| 2013/0115970 A1* | 5/2013 | Hapsari | ................ | H04W 24/02 455/456.1 |
| 2013/0190001 A1* | 7/2013 | Guo | ................ | H04W 4/02 455/450 |
| 2013/0244696 A1* | 9/2013 | Schmidt | ................ | H04W 4/02 455/456.2 |
| 2014/0235271 A1* | 8/2014 | Jung | ................ | H04W 4/02 455/456.1 |
| 2014/0331272 A1* | 11/2014 | Gupta | ................ | H04L 63/20 726/1 |
| 2014/0370915 A1* | 12/2014 | Jung | ................ | H04W 64/00 455/456.1 |
| 2015/0148063 A1* | 5/2015 | Jung | ................ | H04W 64/00 455/456.1 |
| 2015/0208267 A1* | 7/2015 | Jung | ................ | H04W 64/00 455/456.1 |

FOREIGN PATENT DOCUMENTS

| | | |
|---|---|---|
| KR | 10-2011-0088431 A | 8/2011 |
| KR | 10-2011-0088446 A | 8/2011 |
| KR | 10-2011-0123866 A | 11/2011 |
| KR | 10-2011-0139060 A | 12/2011 |
| WO | 2011/136208 A1 | 11/2011 |

OTHER PUBLICATIONS

Change Request; MediaTek: "Introduction of MDT enhancements", 3GPP TSG-RAN WG2 Meeting #76, R2-116518, Nov. 14-18, 2011.

* cited by examiner

METHOD FOR LIMITED POSITIONING-BASED REPORTING IN WIRELESS COMMUNICATION SYSTEM AND APPARATUS THEREFOR

This application is a National Stage Application of International Patent Application No. PCT/KR2013/000710, filed on Jan. 29, 2013, and claims the benefit of U.S. Provisional Application No. 61/591,992, filed on Jan. 29, 2012 in the United States Patent and Trademark Office, all of which are incorporated herein by reference in their entirety.

BACKGROUND OF THE INVENTION

1. Field of the Invention

The present invention relates to wireless communication and, more particularly, to a report method based on restricted positioning in a wireless communication system and an apparatus for supporting the same.

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

A Minimization of Driving Tests (MDT) is that operators perform tests using UE instead of vehicles for coverage optimization purposes. Coverage varies depending on the location of a BS, the deployment of surrounding buildings, and environments used by users. Accordingly, an operator needs to periodically perform driving tests, and great expense and lots of resources are required. The MDT is that an operator measures coverage using UE.

An MDT may be divided into a logged MDT and an immediate MDT. In accordance with the logged MDT, UE performs MDT measurements, and then transfers logged measurements to a network at a specific time point. In accordance with the immediate MDT, UE performs MDT measurements, and then transfers logged measurements to a network when report conditions are satisfied. In the logged MDT, the logging of measured results may be limited to logging the measured results according to measurements performed in RRC idle mode. The logged measurements may be used in RRC connected mode in response to a command from a network. In accordance with the immediate MDT, UE may perform MDT measurements in RRC connected mode.

Assuming that the primary object of the MDT is coverage optimization, UE preferably reports information related to the location where measured results have been obtained along with the corresponding measured results. Accordingly, a network may configure the MDT for only UE capable of providing location information, and may perform a configuration so that corresponding measured results are reported.

If UE reports information about the location of unrestricted coverage although location information desired to be collected by a network is restricted to a specific time zone or a specific network area, the network receives excessively obtained location information, thereby increasing overhead. Furthermore, there may be a problem in that power is unnecessarily consumed because UE performs positioning in order to obtain location information having a low importance. Accordingly, there is a need for a report method based on restricted positioning, wherein location information is more efficiently collected and used in network operations.

SUMMARY OF THE INVENTION

The present invention provides a report method based on restricted positioning in a wireless communication system and an apparatus for supporting the same.

In an aspect, there is provided a report method by UE in a wireless communication system. The method includes receiving positioning restriction information from a network and determining whether or not positioning has been permitted based on the positioning restriction information. The method further includes obtaining location information by performing the positioning, if the positioning has been permitted, and reporting the location information to the network.

The positioning restriction information may be configured to be indicative of the start time point and the end time point of a time interval in which the positioning of the user equipment has been permitted.

Determining whether or not the positioning has been permitted may include determining that the execution of the positioning has been permitted if a time point at which the user equipment operates is between the start time point and the end time point.

The positioning restriction information may be configured to be indicative of the length of the time interval in which the positioning of the user equipment may be permitted. The method may further include starting a restriction timer set to the length, indicated by the positioning restriction information, when the positioning restriction information may be received.

Determining whether or not the positioning has been permitted may include determining that the execution of the positioning has been permitted if the restriction timer is being driven.

The positioning restriction information may be indicative of coverage in which the positioning has been permitted.

The coverage in which the positioning has been permitted may be at least one cell. The positioning restriction information may include a cell list indicative of the at least one cell.

Determining whether or not the positioning has been permitted may include determining that the execution of the positioning has been permitted if the serving cell of the user equipment is indicated by the cell list.

The coverage in which the positioning is permitted may be at least one frequency. The positioning restriction information may include a frequency list indicative of the at least one frequency.

Determining whether or not the positioning has been permitted may include determining that the execution of the positioning has been permitted if the operation frequency of the serving cell of the user equipment is indicated by the frequency list.

The positioning restriction information may be included in a logged measurement configuration including configuration information for a logged Minimization Driving Test (MDT), and may be transmitted.

The method may further include entering a Radio Resource Control (RRC) idle state and performing measurement on a serving cell and/or at least one neighbor cell based on the logged measurement configuration. Obtaining the location information may be performed in the RRC idle state.

The method may further include logging the results of the measurement and the location information if the positioning may be permitted. Reporting the location information to the} network may include reporting a report message, including the logged measured results and location information, to the network.

The method may further include logging the results of the measurement if the positioning is not permitted and reporting the report message, including the logged measured results, to the network.

In another aspect, there is provided a wireless apparatus operating in a wireless communication system operation. The wireless apparatus includes a Radio Frequency (RF) unit that sends and receives radio signals and a processor that may be functionally coupled to the RF unit and operates. The processor is configured to receive positioning restriction information from a network and to determine whether or not positioning has been permitted based on the positioning restriction information. The processor is further configured to obtain location information by performing the positioning if the positioning has been permitted and report the location information to the network.

In accordance with an embodiment of the present invention, a network can restrict positioning so that UE performs positioning only in a specific time interval or a specific network area. Accordingly, the network can obtain location information in the time and place at which location information obtained through positioning may be more usefully used. In contrast, the network can restrict a report on location information in the time and area at which the importance of location information is relatively low, thereby being capable of reducing overhead. Through such selective collection of location information, network optimization can be more efficiently performed, and the performance of a wireless communication system can be further improved.

DESCRIPTION OF EXEMPLARY EMBODIMENTS

Figure 1:
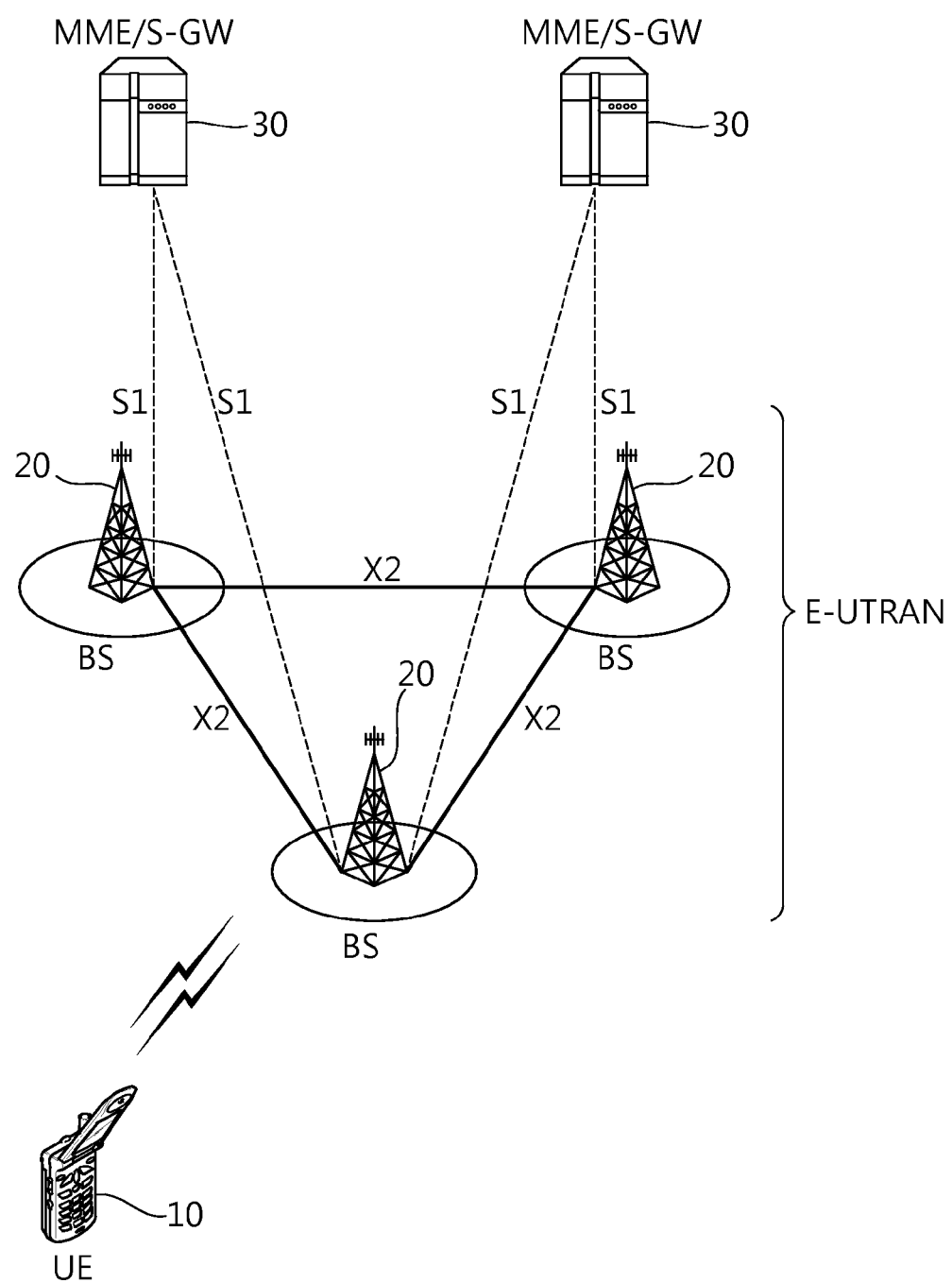
FIG. 1 illustrates a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
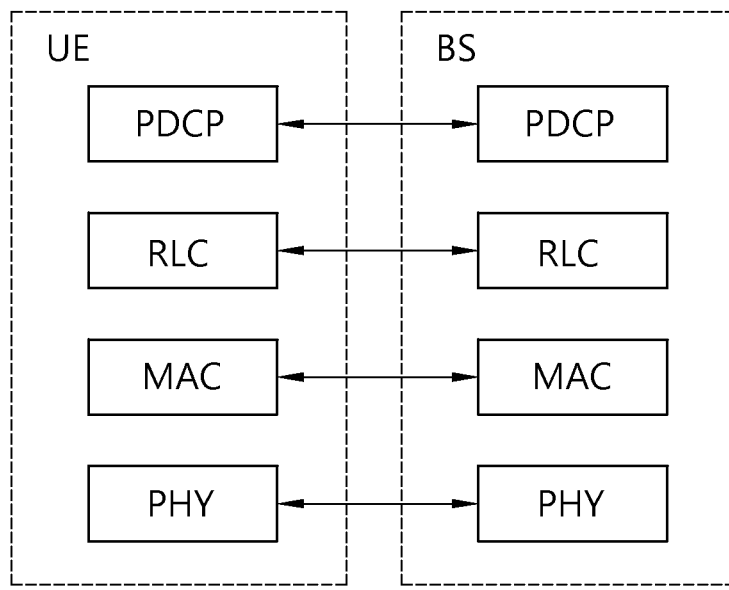
FIG. 2 is a block diagram showing the structure of a wireless protocol on the user plane.
Figure 3:
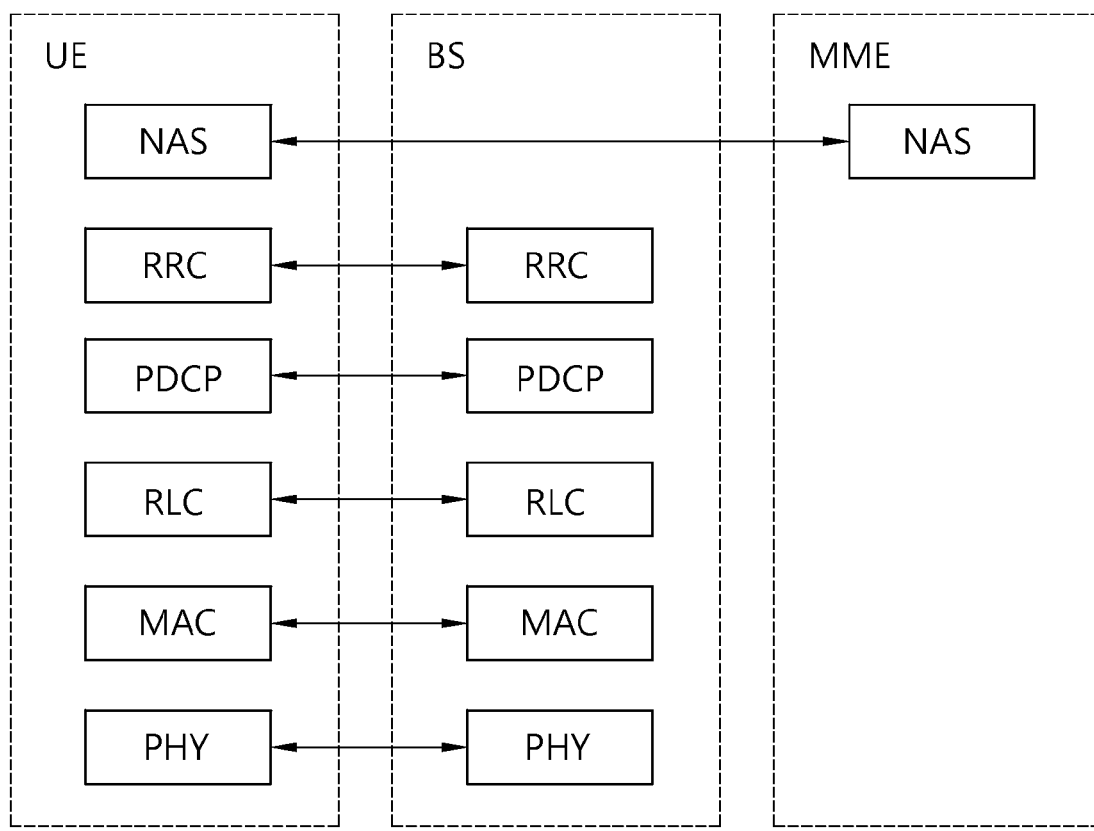
FIG. 3 is a block diagram showing the structure of a wireless protocol on the control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell.

In accordance with Paragraph 5.2.2 of 3GPP TS 36.331 V8.7.0 (2009-09) "Radio Resource Control (RRC); Protocol specification (Release 8)", the system information is classified into a Master Information Block (MIB), a Scheduling Block (SB), and a System Information Block (SIB). The MIB informs UE of the physical configuration of a corresponding cell, for example, a bandwidth. The SB informs UE of information about the transmission of SIBs, for example, a transmission cycle. The SIB is a set of pieces of correlated system information. For example, a specific SIB includes only information about surrounding cells, and a specific SIB includes only information about an uplink radio channel used by UE.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
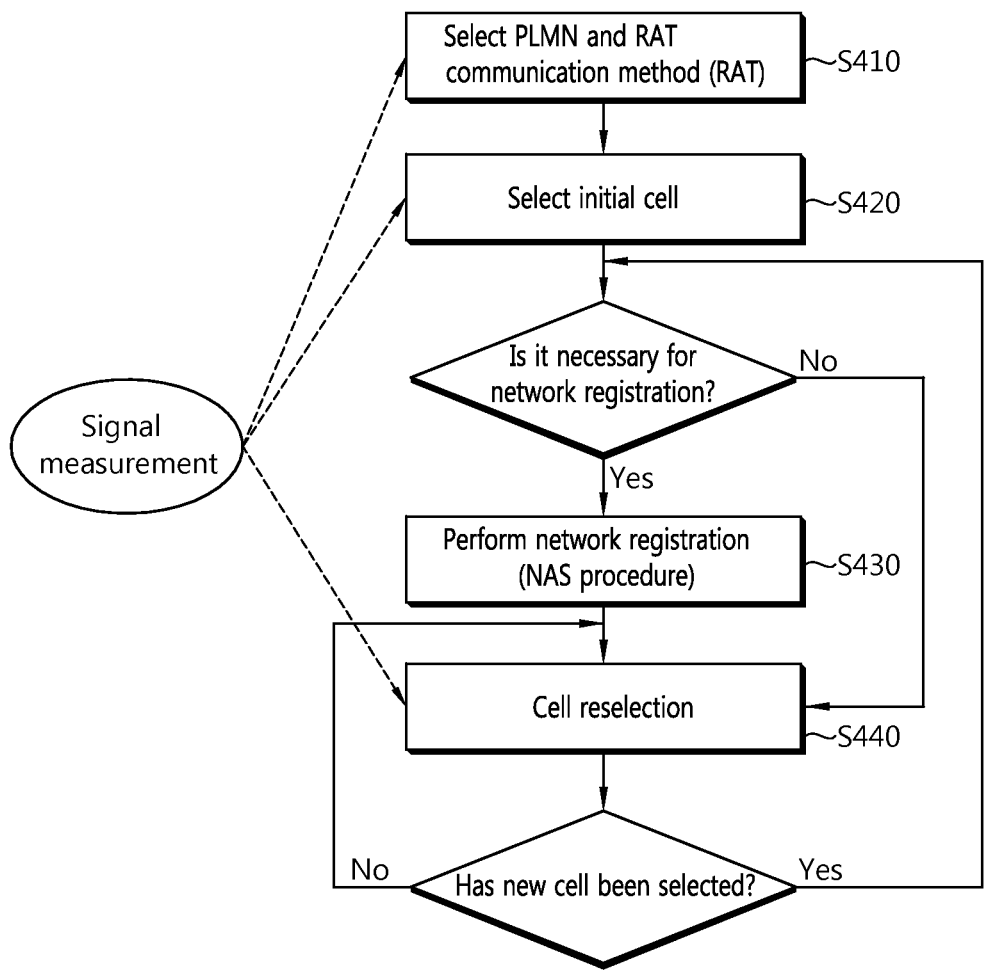
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
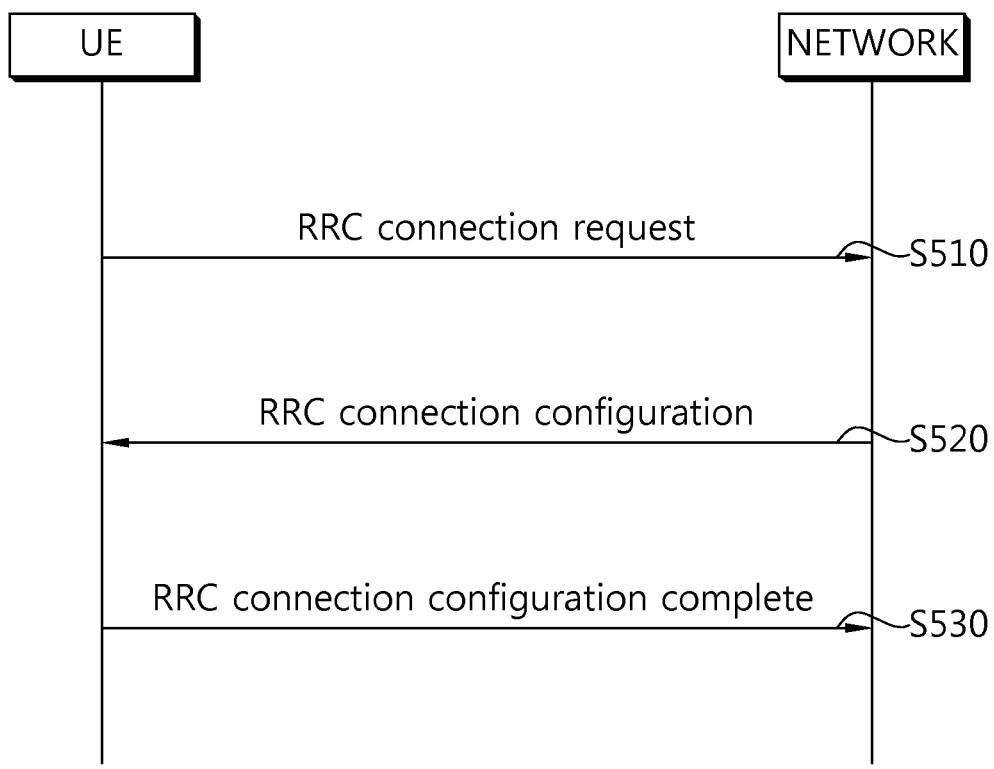
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
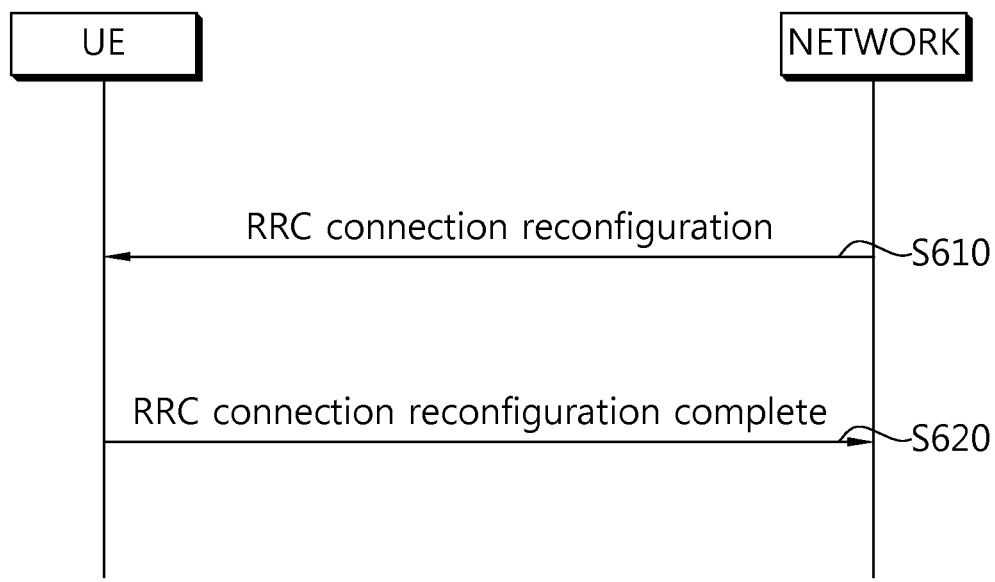
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

A procedure of selecting, by UE, a cell is described in detail.

When UE is powered on or camps on in a cell, the UE selects/reselects a cell having proper quality and performs procedures for being provided with service.

UE in the RRC idle state needs to always select a cell having proper quality and to be prepared to be provided with service through the cell. For example, UE that is initially powered on needs to select a cell having proper quality in order to register it with a network. If UE in the RRC connection state enters the RRC idle state, the UE needs to select a cell on which the UE will camp in the RRC idle state. As described above, a process of selecting, by UE, a cell that satisfies some conditions in order to camp on in a service standby state, such as the RRC idle state, is called cell selection. An important point is that the cell rapidly selects a cell because cell selection is performed in the state in which the UE has not determined a cell on which the UE will camp in the RRC idle state. Accordingly, if a cell is a cell that provides the quality of a radio signal of a specific reference or higher, the cell may be selected in the cell selection process of UE although the cell is not a cell that provides the best radio signal quality to the UE.

A method and procedure in which UE selects a cell in 3GPP LTE is described in detail with reference to 3GPP TS 36.304 V8.5.0 (2009-03) "User Equipment (UE) procedures in idle mode (Release 8)."

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_s = Q_{meas,s} + Q_{hyst}, R_n = Q_{meas,s} - Q_{offset}$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets, n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Radio Link Monitoring (RLM) is described below.

UE monitors downlink quality based on a cell-specific reference signal in order to detect the quality of the downlink radio link of a PCell. The UE estimates the quality of a downlink radio link in order to monitor the quality of the downlink radio link of the PCell, and compares the estimated quality with threshold values Qout and Qin. The threshold value Qout is defined as a level at which a downlink radio link is unable to be stably received, which corresponds to a block error rate of 10% of hypothetical PDCCH transmission by taking into consideration a PDFICH error. The threshold value Qin is defined as a downlink radio link quality level at which a downlink radio link is able to be more stably received than compared to the level of Qout, which corresponds to a block error rate of 2% of hypothetical PDCCH transmission by taking into consideration a PDFICH error.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE
  A case where uplink transmission is problematic because a random access procedure continues to fail in the MAC sublayer.
  A case where uplink transmission is problematic because uplink data transmission continues to fail in the RLC sublayer.
  A case where handover is determined to have failed.
  A case where a message received by UE does not pass through an integrity check.

An RRC connection re-establishment procedure is described in more detail below.

Figure 7:
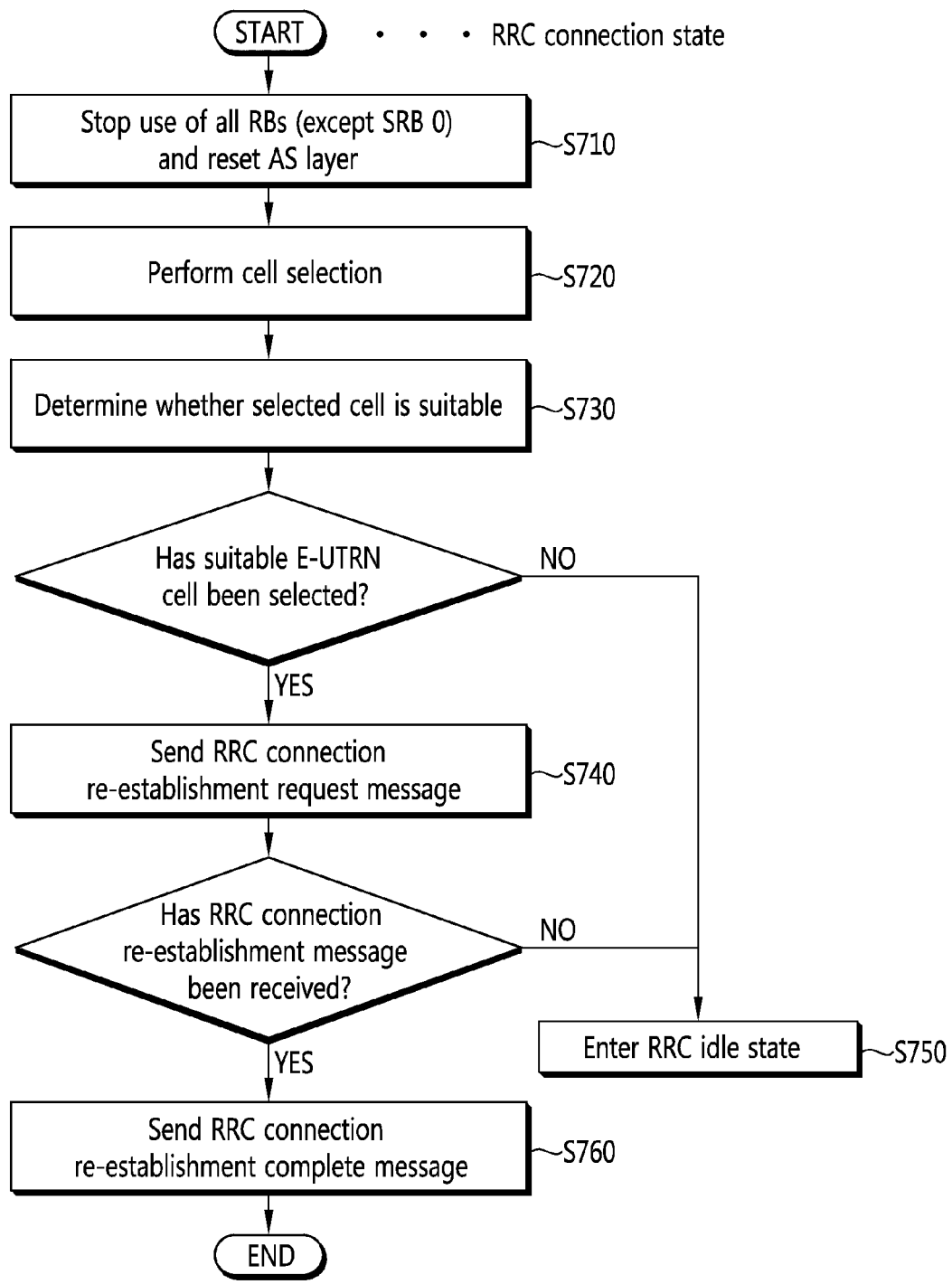
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

A report on an RLF is described below.

When an RLF occurs or a handover failure occurs, UE reports such a failure event to a network in order to support the Mobility Robustness Optimization (MRO) of the network.

After RRC connection re-establishment, the UE may provide the RLF report to the eNB. Wireless measurement includes in the RLF report may be used for a potential reason of a failure in order to identify coverage problems. Such information may be used to borrow such events as input to other algorithms by excluding the events in MRO evaluation for an intra-LTE mobility connection failure.

If RRC connection re-establishment fails or UE does not perform RRC connection re-establishment, the UE may be connected again in idle mode, and may generate a valid RLF report on an eNB. For such an object, the UE may store information related to the most recent RLF or handover failure, and may inform an LTE cell that an RLF report is valid every RRC connection (re)establishment and handover until the RLF report is fetched by a network or for 48 hours after an RLF or handover failure is detected.

The UE maintains the information for a state shift and a change of RAT, and indicates that the RLF report is valid again after returning back to LTE RAT.

In an RRC connection establishment procedure, the validity of an RLF report means that UE has experienced obstruction, such as a connection failure, and an RLF report attributable to the failure has not yet been transferred to a network. The RLF report from the UE includes the following information.

If the last cell (in the case of an RLF) that has provided service to the UE or the E-CGI of a target for handover has not been known, a PCI and frequency information are used instead.

The E-CGI of a cell at which re-establishment has been attempted.

When initializing the last handover, for example, when a message 7 (an RRC connection reconfiguration) is received by the UE, the E-CGI of a cell that has provided service to the UE.

The time that has elapsed from the initialization of the last handover to a connection failure.

Information indicative of whether the connection failure is attributable to an RLF or a handover failure.

Wireless measurements.

The location of a failure.

The eNB that has received the RLF from the UE may forward the report to an eNB that had provided service to the UE prior to the reported connection failure. Wireless measurements included in the RLF report may be used to identify coverage issues as a potential cause of an RLF. Such information may be used to send events to other algorithm as input again by excluding the events from the MRO evaluation of an intra-LTE mobility connection failure.

Measurement and a measurement report are described below.

In a mobile communication system, to support the mobility of UE is essential. Accordingly, the UE continues to measure the quality of a serving cell from which the UE is now provided with service and the quality of a neighbor cell. The UE reports measured results to a network on a proper time, and the network provides optimum mobility to the UE through handover, etc. In general, measurement for this purpose is called a Radio Resource Management (RRM) measurement.

In order to provide information that may help an operator to operate a network in addition to the mobility support object, UE may perform measurement for a specific object set by the network, and may report measured results thereof to the network. For example, UE receives the broadcast information of a specific cell that has been determined by the network. The UE may report the cell identity (this is also called a global cell identity) of the specific cell, identity information about the location to which the specific cell belongs (e.g., Tracking Area Code) and/or other pieces of cell information (e.g., whether or not it is a member of a Closed Subscriber Group (CSG) cell) to the serving cell.

If UE checks that the quality of a specific area is very poor through measurement while moving, the UE may report location information and measured results for cells having poor quality to a network. A network may perform network optimization based on the reports of the measured results of UEs that help the operation of the network.

In a mobile communication system in which frequency reuse (frequency reuse factor) is 1, mobility is chiefly performed between difference cells that belong to the same frequency band. Accordingly, in order to well guarantee the mobility of UE, the UE needs to well measure the quality of neighboring cells having the same center frequency as a serving cell and information about the cells. As described above, the measurement of a cell having the same center frequency as a serving cell is called intra-frequency measurement. UE performs intra-frequency measurement and reports measured results thereof to a network on a proper time so that the object of corresponding measured results is achieved.

A mobile communication operator may operate a network using a plurality of frequency bands. If the service of a communication system is provided through a plurality of frequency bands, in order to guarantee optimum mobility for UE, the UE needs to well measure the quality of neighboring cells having center frequencies from the center frequency of a serving cell and information about the cells. As described above, the measurement of a cell having a center frequency different from the center frequency of a serving cell is called inter-frequency measurement. UE needs to be able to perform inter-frequency measurement and to report measured results thereof to a network on a proper time.

If UE supports the measurement of a heterogeneous network, the UE may measure the cell of a heterogeneous network according to a BS configuration. The measurement of such a heterogeneous network is called inter-Radio Access Technology (RAT) measurement. For example, RAT may include an UMTS Terrestrial Radio Access Network (UTRAN) and a GSM EDGE Radio Access Network (GERAN) that comply with the 3GPP standard, and may also include CDMA 2000 systems that comply with the 3GPP2 standard.

Figure 8:
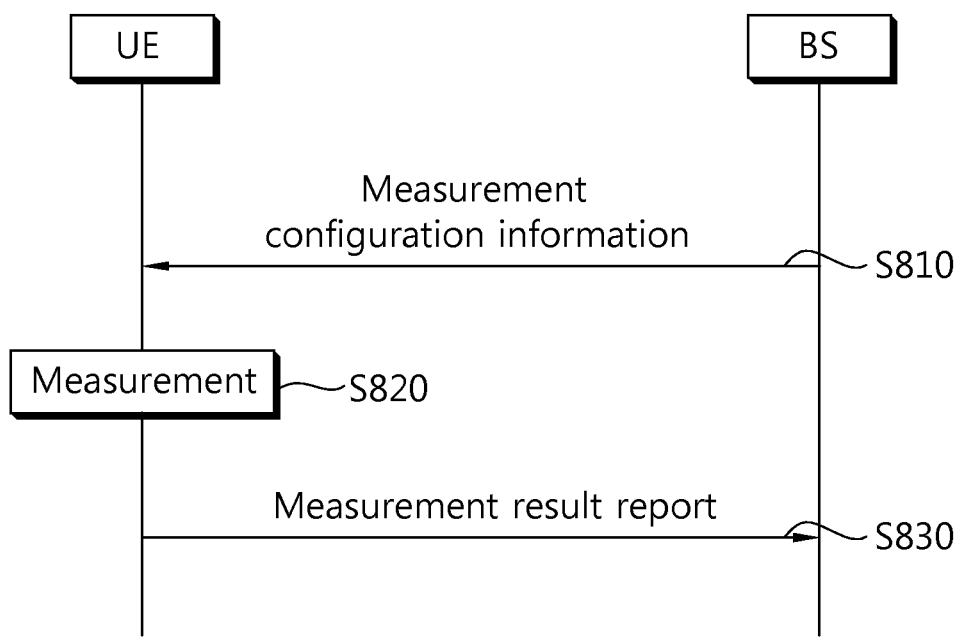
FIG. 8 is a flowchart illustrating a method of performing measurement.

FIG. 8 is a flowchart illustrating a method of performing measurement.

UE receives measurement configuration information from a BS (S810). A message including the measurement configuration information is called a measurement configuration message. The UE performs measurements based on the measurement configuration information (S820). If measured results satisfy report conditions within the measurement configuration information, the UE reports the measured results to the BS (S830). A message including the measured results is called a measurement report message.

The measurement configuration information may include the following information.

(1) Measurement object information: it is information about the object on which UE will perform measurement. A measurement object includes at least one of an intra-frequency measurement object that is the object of measurement within a cell, an inter-frequency measurement object that is the object of measurement between cells, and an inter-RAT measurement object that is the object of inter-RAT measurement. For example, the intra-frequency measurement object may indicate a neighboring cell having the same frequency band as a serving cell, the inter-frequency measurement object may indicate a neighboring cell having a frequency band different form that of a serving cell, and the inter-RAT measurement object may indicate a neighboring cell having RAT different from that of a serving cell.

(2) Reporting configuration information: this is information about report conditions regarding when UE reports measured results and a report type. The report conditions may include information about an event or cycle on which the report of the measured results is triggered. The report type is information regarding that the measured results will be configured in what type.

(3) Measurement identity information: this is information about a measurement identity that associates a measurement object with a reporting configuration so that UE determines to report what measurement object when and in what type. Each measurement identity associates a single measurement object with a single reporting configuration. By configuring a plurality of measurement identities, one or more reporting configurations may be associated with the same measurement object, and one or more measurement objects may also be associated with the same reporting configuration. A measurement identity may be used as a reference numeral within a measurement report. Measurement identity information may be included in a measurement report message, and may be indicative that measured results are for which measurement object and that a measurement report has occurred due to what report conditions.

(4) Quantity configuration information: quality configuration information defines the amount of measurement and defines associated filtering used for reports related to the evaluation of all events and measurement types thereof. A single filter may be set in each measurement quantity.

(5) Measurement gap information: this is information about a measurement gap, that is, a section that may be used for UE to perform only measurement by not taking into consideration data transmission with a serving cell because downlink transmission or uplink transmission has not been scheduled.

In order to perform a measurement procedure, UE has a measurement object list, a measurement report configuration list, and a measurement identity list.

In 3GPP LTE, a BS may configure only one measurement object for a single frequency band in relation to UE. In accordance with Paragraph 5.5.4 3GPP TS 36.331 V8.5.0 (2009-03) "Evolved Universal Terrestrial Radio Access (E-UTRA) Radio Resource Control (RRC); Protocol specification (Release 8)," events that trigger measurement reports are defined in the following table.

TABLE 1

| Event | Report Conditions |
| --- | --- |
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

If the measured results of UE satisfy a set event, the UE sends a measurement report message to a BS.

Figure 9:
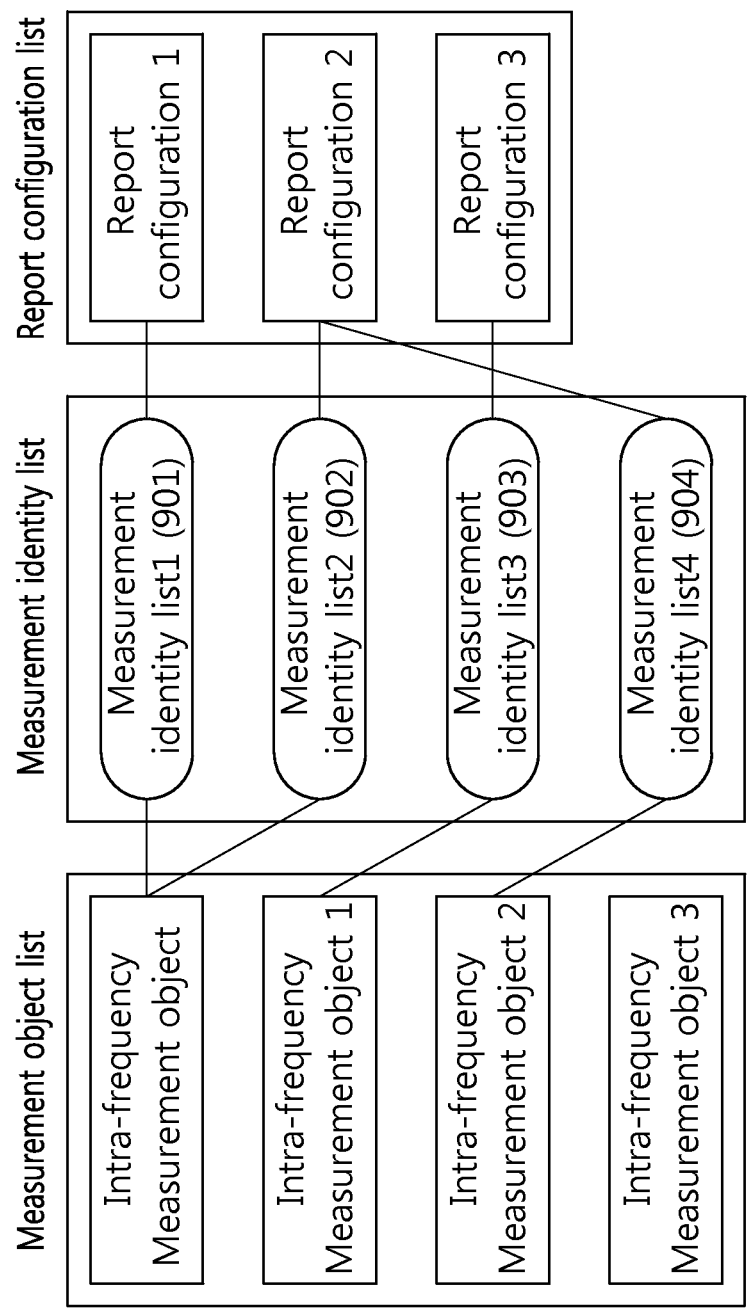
FIG. 9 illustrates an example of a measurement configuration configured to UE.

FIG. 9 illustrates an example of a measurement configuration configured to UE.

First, a measurement identity 1 901 connects an intra-frequency measurement object and a reporting configuration 1. UE performs intra-cell measurement (intra-frequency measurement), and the reporting configuration 1 is used to determine the criterion of a measurement result report and a report type.

A measurement identity 2 902 is connected to the intra-frequency measurement object like the measurement identity 1 901, but it connects the intra-frequency measurement object to a reporting configuration 2. UE performs measurement, and the reporting configuration 2 is used to determine the criterion of a measurement result report and a report type.

In accordance with the measurement identity 1 901 and the measurement identity 2 902, UE sends the measured results of the intra-frequency measurement object although the measured results satisfy any one of the reporting configuration 1 and the reporting configuration 2.

A measurement identity 3 903 connects an inter-frequency measurement object 1 and a reporting configuration 3. UE reports the measured results of the inter-frequency measurement object 1 if the measured results satisfy report conditions included in the reporting configuration 1.

A measurement identity 4 904 connects an inter-frequency measurement object 2 and the reporting configuration 2. UE reports the measured results of the inter-frequency measurement object 2 if the measured results satisfy report conditions included in the reporting configuration 2.

Meanwhile, a measurement object, a reporting configuration and/or a measurement identity may be added, changed and/or deleted. This may be indicated in such a manner that a BS sends a new measurement configuration message to UE or sends a measurement configuration change message to the UE.

Figure 10:
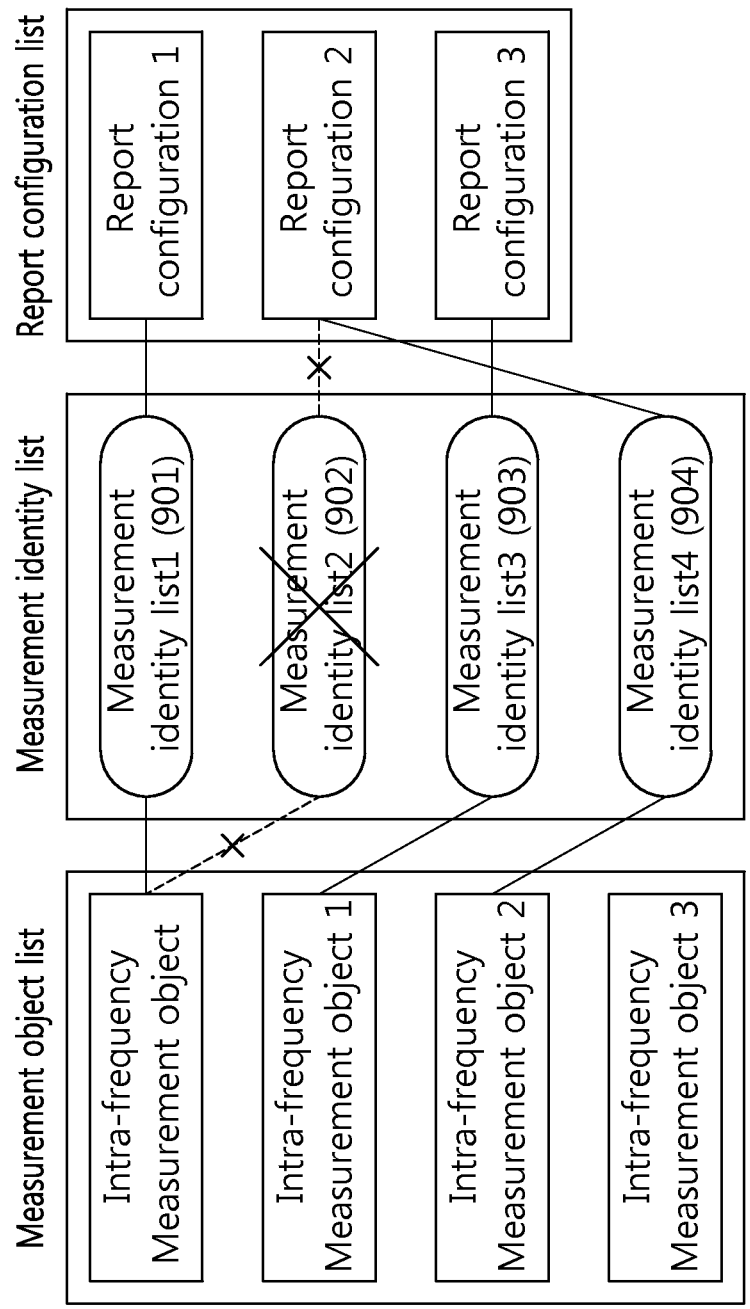
FIG. 10 illustrates an example in which a measurement identity is deleted.

FIG. 10 illustrates an example in which a measurement identity is deleted. When a measurement identity 2 902 is deleted, the measurement of a measurement object associated with the measurement identity 2 902 is stopped, and a measurement report is not transmitted. A measurement object or a reporting configuration associated with a measurement identity may not be changed.

Figure 11:
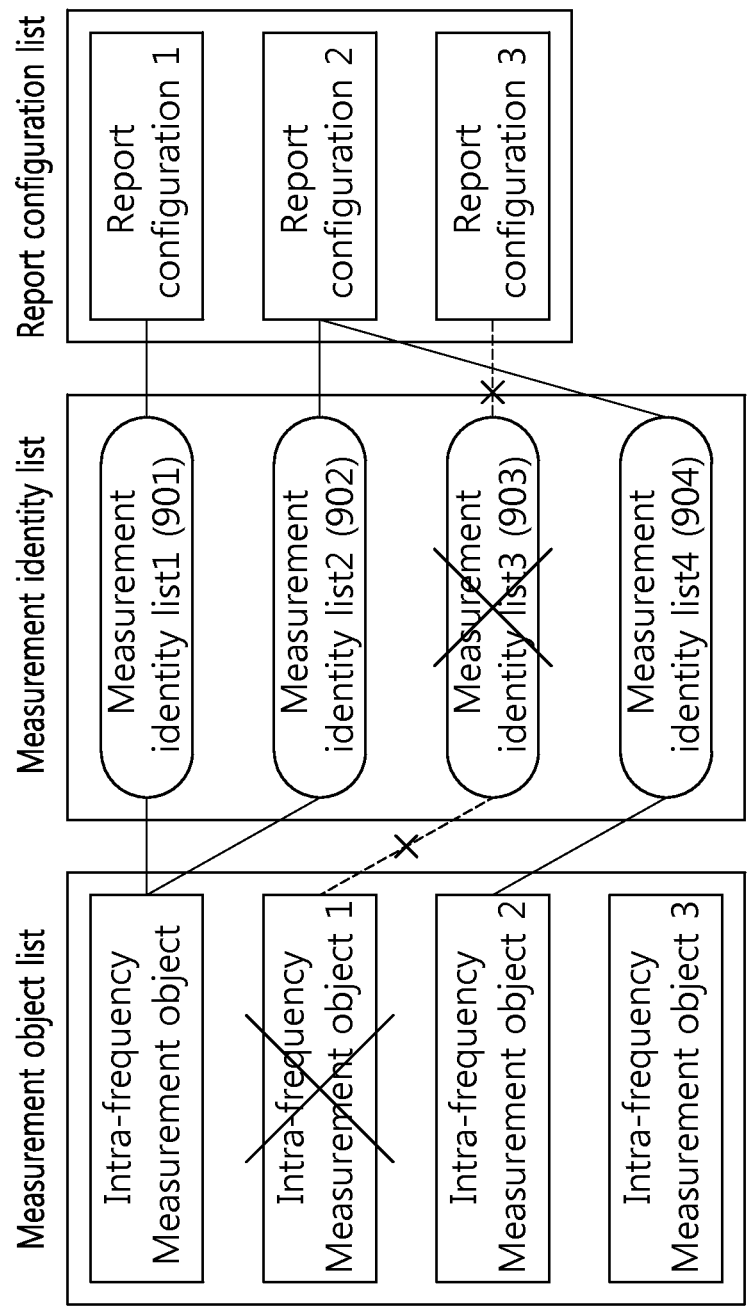
FIG. 11 illustrates an example in which a measurement object is deleted.

FIG. 11 illustrates an example in which a measurement object is deleted. When an inter-frequency measurement object 1 is deleted, UE also deletes an associated measurement identity 3 903. The measurement of the inter-frequency measurement object 1 is stopped, and a measurement report is not transmitted. However, a reporting configuration associated with the deleted inter-frequency measurement object 1 may not be changed or deleted.

When a reporting configuration is removed, UE also removes an associated measurement identity. The UE stops the measurement of a measurement object associated by the associated measurement identity. However, a measurement object associated with a deleted reporting configuration may not be changed or deleted.

A measurement report may include a measurement identity, the measured quality of a serving cell, and the measured results of a neighboring cell. A measurement identity identifies a measurement object whose measurement report has been triggered. The measured results of a neighboring cell may include the cell identity and measured quality of the neighboring cell. Measured quality may include at least one of Reference Signal Received Power (RSRP) and Reference Signal Received Quality (RSRQ).

Accessibility measurement is described below.

To handle the non-availability measurement of connection for UE has many aspects. In this case, both common channels and connection procedures are handled. In order to inform a network of the non-availability of connection and thus assist parameter optimization for increasing the availability of connection, UE performs accessibility measurement when connection establishment fails. For the accessibility measurement, the UE performs the following logging.

A time stamp derived using a relative timer for counting the time between a failure and a report is included. A storage time for accessibility measurement is 48 hours.

Reporting the number of transmitted random access preamble is supported.

Indicating whether or not a maximum power level has been reached is supported.

Indicating whether or not a contention has been detected during a random access procedure for connection establishment is included.

A Tacking Collection Entity (TCE) is described below.

A subscriber and equipment traces very detailed information to one or more specific mobiles in terms of a call level. The data may be an additional source for information for performance measurements. Furthermore, the data enables a further deep monitoring and optimization operation to be performed. Unlike in a performance measurement that is always the source of information, the trace may be activated in response to user needs/requirements during a limited time interval for a specific analysis purpose. The trace plays a very important role in operations, such as determining a fundamental cause of a malfunctioning mobile, an improved troubleshoot, the optimization the use of resource and quality, control of Radio Frequency (RF) coverage, capacity improvements, an analysis of a break-up phenomenon during a call, and the check of an UMTS procedure between the ends of a core network and an UTRAN.

For service initiated by a specific user (e.g., an International Mobile Subscriber Identity (IMSI)), a mobile type (e.g., an International Mobile Equipment Identity (IMEI) Software Version (IMEISV)), or a user, a function for logging data on an interface in a call level enables information that may not be inferred from performance measurements, such the recognition of the final user QoS during a call (e.g., requested QoS versus provided QoS), a correlation between protocol messages and RF measurements, or mutual information processing operation with specific mobile vendors, to be obtained. Trace data is collected by the TCE.

A Minimization of Driving Tests (MDT) is described below.

An MDT enables UE to perform measurements and to report the results of the measurement instead of a drive test in which conventional operators measure the quality of cells using vehicles for the coverage optimization of the cells. Coverage varies depending on the location of a BS, the deployment of surrounding buildings, and an environment used by a user. Accordingly, an operator needs to periodically perform a drive test, which requires great expense and lots of resources. In order to overcome such a disadvantage, there is proposed an MDT in which an operator measures coverage using UE.

An operator may synthesize MDT measurement values received from multiple UEs, may write a coverage map indicative whether service is available in an overall area in which an operator provides the service and a distribution of qualities of service, and may use the coverage map in network operations and optimization. For example, when a coverage problem in a specific area is reported by UE, an operator may extend the coverage of a cell in the corresponding area by increasing the transmission power of a BS that provides service in the corresponding area. The time and expense for network optimization can be minimized through such as method.

The MDT has been made based on the framework of a trace function, that is, one of the tools of an operator for Operation, Administration, and Maintenance (OAM). The trace function provides an operator with the ability to perform trace and log the behaviors of UE, and thus it may enable a main cause of a defective function on the UE side to be determined. Traced data is collected over a network, and is called a Trace Collection Entity (TCE). An operator uses data collected by a TCE for analysis and evaluation purposes. A trace function used for an MDT includes signaling based on the trace function and management based on trace functions. Signaling based on a trace function is used to activate an MDT task toward specific UE, whereas management based on trace functions is used to activate an MDT task without being limited to specific UE.

An MDT may be divided into two types: a logged MDT and an immediate MDT depending on whether UE reports measured and stored log data in a real-time manner or in real time. The logged MDT is a method by which UE performs MDT measurements, logs measurement data, and subsequently sends the logged data to a network. In contrast, the immediate MDT is a method by which UE performs MDT measurements and immediately sends measurement data to a network. In accordance with the logged MDT, UE may perform MDT measurements in the RRC idle state. In accordance with the immediate MDT, UE performs MDT measurements in the RRC connection state.

Figure 12:
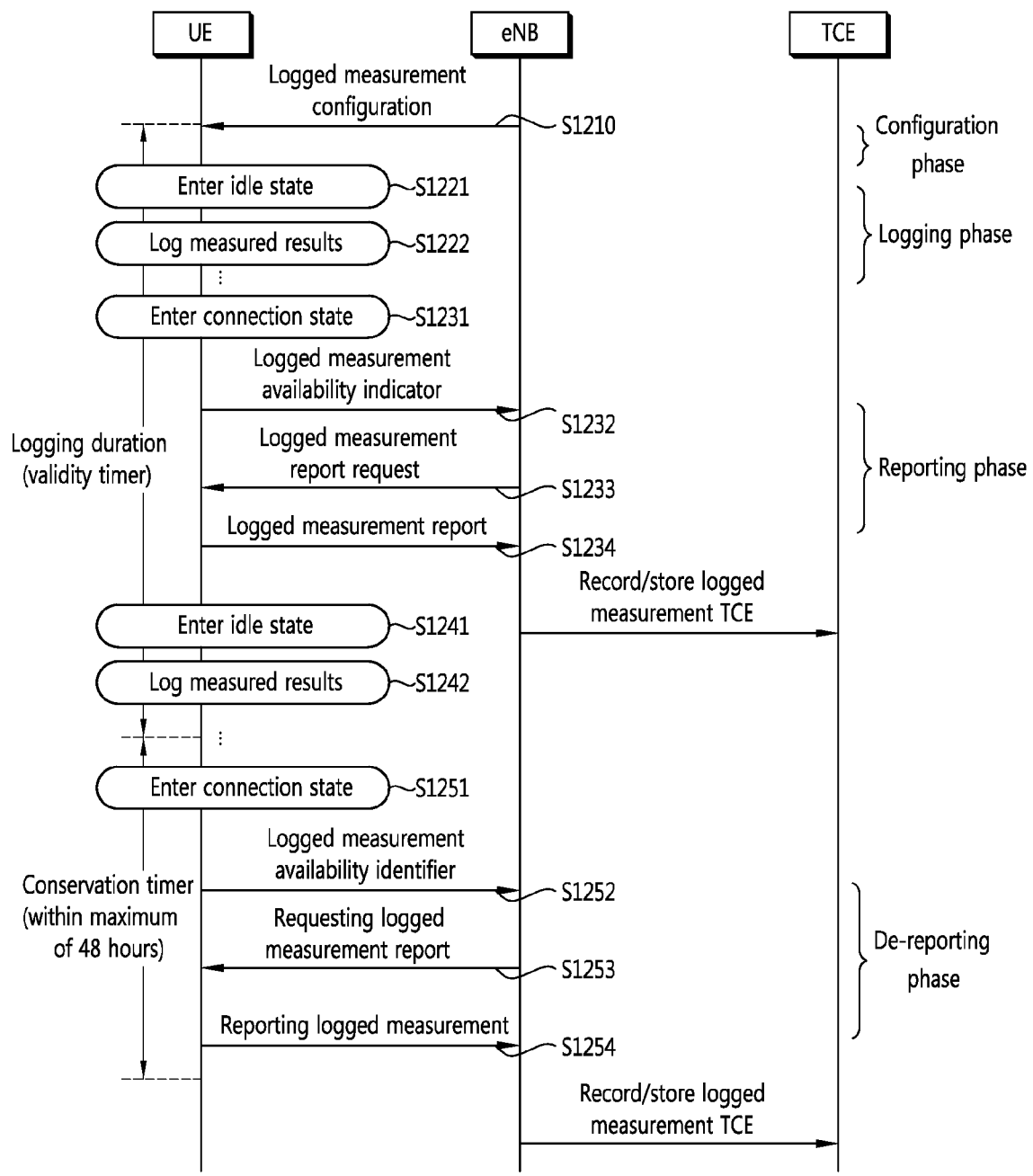
FIG. 12 is a flowchart illustrating a method of performing a logged MDT.

FIG. 12 is a flowchart illustrating a method of performing a logged MDT.

Referring to FIG. 12, UE receives a logged measurement configuration (S1210). The logged measurement configuration may be included in an RRC message, and may be transmitted through a downlink control channel. The logged measurement configuration may include at least one of the ID of a TCE, information about the time that is a reference on which logging is performed (i.e., a reference time), logging duration, a logging interval, and information about an area configuration. The logging interval is indicative of an interval in which measured results are stored. The logging duration is indicative of duration for which UE performs a logged MDT. The reference time is indicative of the time that is the reference of duration for which a logged MDT is performed. The area configuration is indicative of an area on which the execution of logging has been requested by UE.

Meanwhile, the UE starts a validity timer when receiving the logged measurement configuration. The validity timer is indicative of the lifespan of the logged measurement configuration, and may be specified based on information about logging duration. The duration of the validity timer may be indicative of the validity of measured results owned by the UE in addition to the valid lifespan of the logged measurement configuration.

As described above, a procedure in which the UE performs the logged measurement configuration and a corresponding overall procedure is performed is called a configuration phase.

When the UE enters the RRC idle state (S1221), the UE logs measured results while the validity timer operates (S1222). The value of the measured results may be RSRP, RSRQ, Received Signal Code Power (RSCP), or Ec/No. Information on which the measured results have been logged is hereinafter called logged measurement and/or a measurement result log. A temporal section in which UE logs measured results at least more than once is called a logging phase.

To perform the logged MDT based on the logged measurement configuration by the UE may vary depending on the location where the UE is present.

Figure 13:
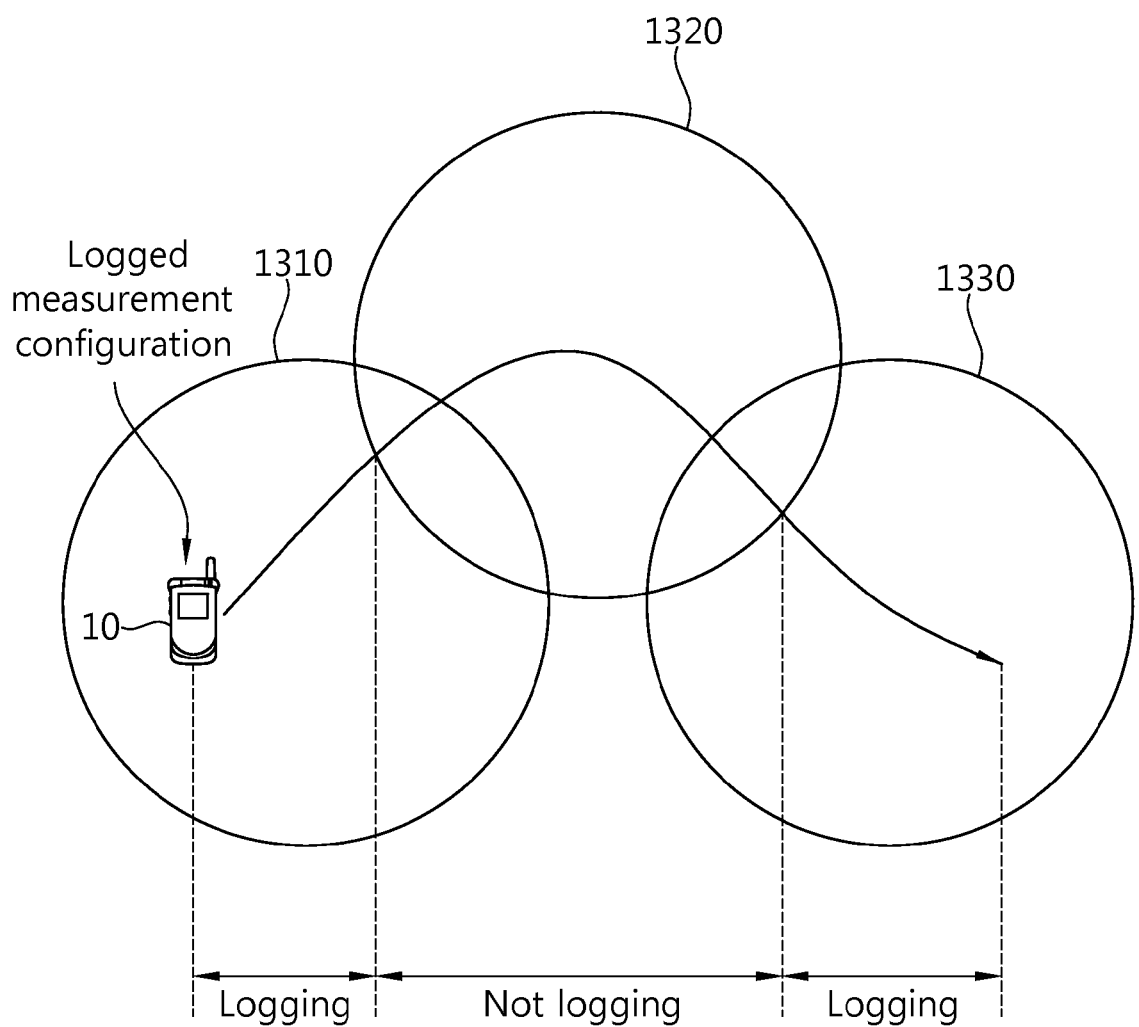
FIG. 13 is a diagram illustrating an example of a logged MDT according to a logged area.

FIG. 13 is a diagram illustrating an example of a logged MDT according to a logged area.

A network may configure a logging area, that is, an area on which UE has to log. The logging area may be expressed as a cell list, or may be expressed as a tracking area/location area list. If a logging area is configured or UE, the UE stops logging if it deviates from the logging area.

Referring to FIG. 13, a first area 1310 and a third area 1330 are areas configured as logging areas, and a second area 1320 is an area in which logging is not permitted. UE performs logging in the first area 1310, but does not perform logging in the second area 1320. The UE perform logging again when it moves from the second area 1320 to the third area 1330.

Figure 14:
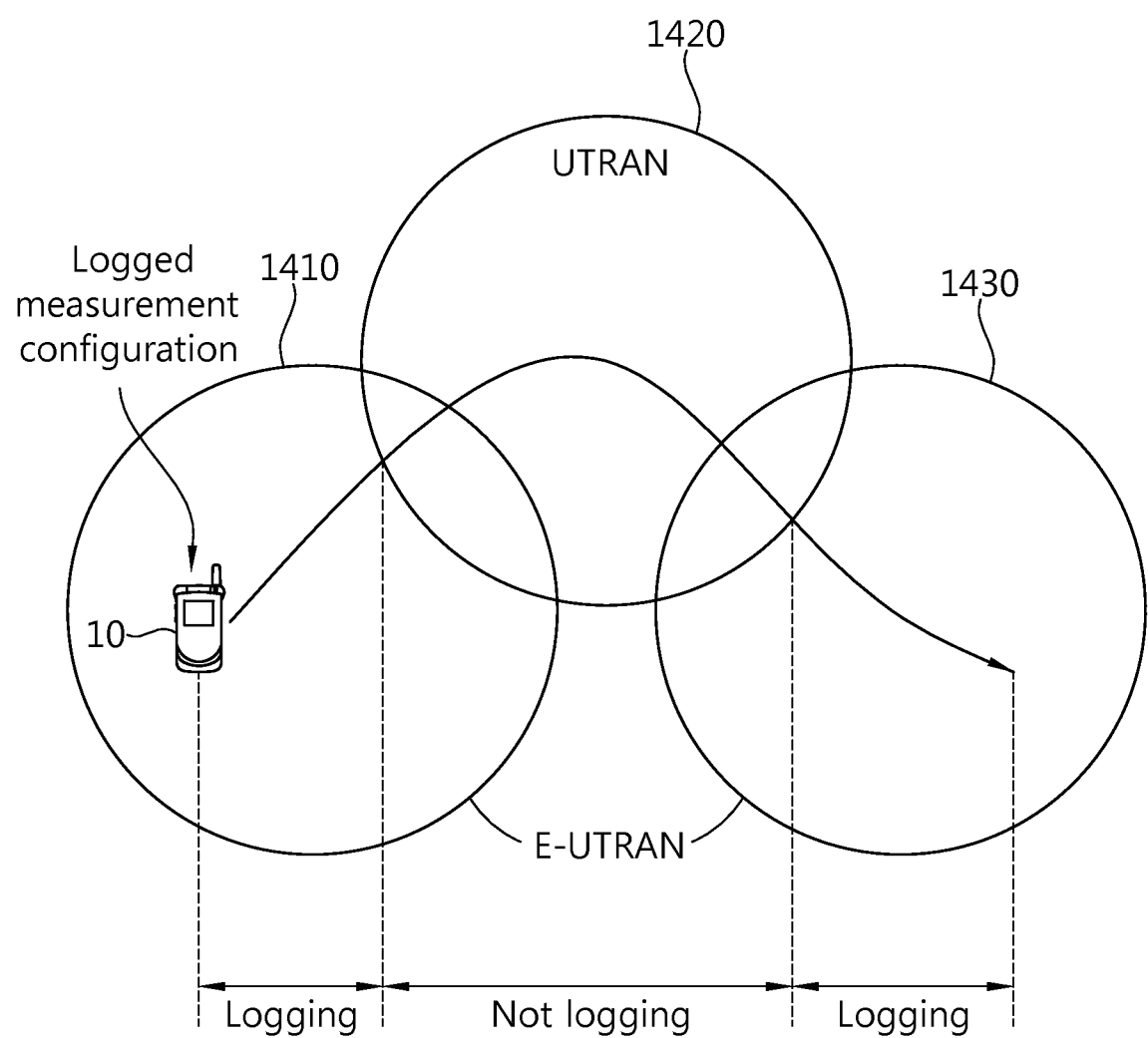
FIG. 14 is a diagram illustrating an example of a logged MDT according to a change of RAT.

FIG. 14 is a diagram illustrating an example of a logged MDT according to a change of RAT.

UE performs logging only when it camps on RAT from which a logged measurement configuration has been received, but stops logging in other RATs. In this case, the UE may log cell information for other RATs in addition to the RAT on which the UE camps.

A first area 1410 and a third area 1430 are E-UTRAN areas, and a second area 1420 is an UTRAN area. A logged measurement configuration is received from the E-UTRAN. UE does not perform MDT measurement when it enters the second area 1420.

Referring back to FIG. 12, the UE enters the RRC connection state (S1231). If logged measurement to be reported is present, the UE informs an eNB that the logged measurement to be reported is present (S1232). The UE may inform the eNB that the logged measurement to be reported is present when RRC connection is established, RRC connection is re-established, or RRC connection is reconfigured. Furthermore, if the UE performs handover, the UE may inform the eNB that logged measurement for a handover target cell is present. To inform, by the UE, the eNB that the logged measurement is present may include including a logged measurement-available indicator, that is, indication information that provides notification of the presence of the logged measurement, in an RRC message transmitted from the UE to the eNB, and sending the RRC message including the logged measurement-available indicator. The RRC message may be an RRC connection establishment complete message, an RRC connection re-establishment complete message, an RRC reconfiguration complete message, or a handover complete message.

When a signal that provides notification of the presence of the logged measurement is received from the UE, the eNB requests the UE to report the logged measurement (S1233). To request the logged measurement to be reported may include including a logged measurement report request parameter regarding information indicative of the request in an RRC message, and sending the RRC message including the logged measurement report request parameter. The RRC message may be a UE information request message.

When the UE receives the request to report the logged measurement from the eNB, the UE reports the logged measurement to the eNB (S1234). To report the logged measurement to the eNB may include including a logged measurement report, including the logged measurement, in an RRC message, and sending the RRC message to the eNB. The RRC message may be a UE information report message. In reporting the logged measurement, the UE may report all the logged measurements of the UE at a report time point to the eNB, or may report some of all the logged measurements to the eNB. If some of the logged measurements are reported, the reported some measurements may be discarded.

A phase in which a process of informing, by the UE, the eNB that the logged measurement is present, receiving the request to report the logged measurement from the eNB, and reporting the logged measurement in response to the request is performed as described above is called a reporting phase.

While the logged MDT is performed, the UE chiefly measures a wireless environment. The MDT measurement may include the identity of a cell and the signal quality and/or signal intensity of the cell. The MDT measurement may include a measurement time and a measurement place. The following table illustrates contents logged by UE.

TABLE 2

| Parameter (set) | Description |
| --- | --- |
| Serving cell identity | Global cell identity of serving cell |
| Measured results of serving cell | Measured RSRP of serving cell<br>Measured RSRQ of serving cell |
| Measured results of neighbor cell | Cell identities of measured E-UTRA cells, measured results of E-UTRA cells<br>Cell identities of measured UTRA cells, measured results of UTRA cells<br>Cell identities of measured GERAN cells, measured results of GERAN cells<br>Cell identities of measured CDMA 2000 cells, measured results of CDMA 2000 cells |
| Time stamp | The moment of logging measurement results, calculated (as current time minus absolute TimeStamp in seconds) |
| Location information | Detailed location information at the moment of logging |

Pieces of information logged at different logging time points may be stored as follows so that they are classified as different log entries.

Figure 15:
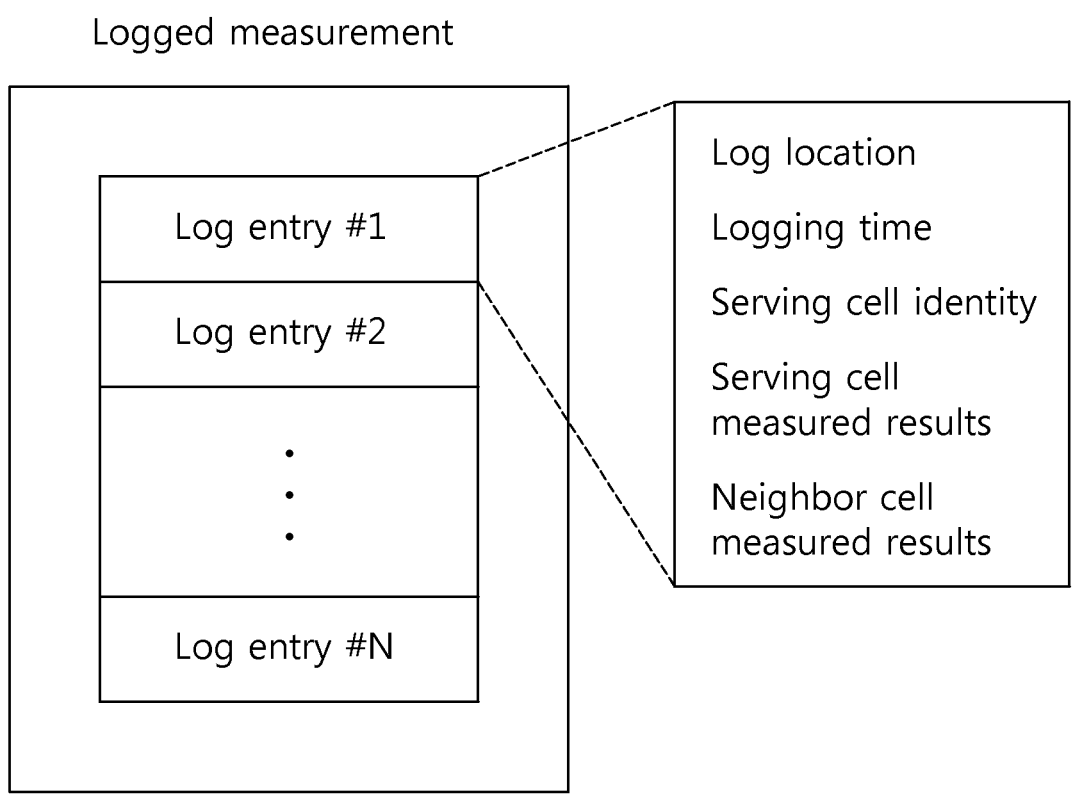
FIG. 15 is a diagram illustrating an example of logged measurements.

FIG. 15 is a diagram illustrating an example of logged measurements.

Logged measurement includes one or more log entries.

The log entry includes a logging location, a logging time, a serving cell identity, the measured results of a serving cell, and the measured results of a neighboring cell.

The logging location is indicative of the location where UE was measured. The logging time is indicative of the time when UE was measured. Pieces of information logged at different logging times are stored in different log entries.

The serving cell identity may include a cell identity in Layer 3, which is called a Global Cell Identity (GCI). The GCI is a set of a Physical Cell Identity (PCI) and a PLMN identity.

Meanwhile, UE may analyze indices related to the performance of the UE in addition to a wireless environment, and log the analyzed indices. For example, the indices may include throughput, an erroneous transmission/reception rate, etc.

Referring back to FIG. 12, the logging phase and the reporting phase may be present in logging duration plural times (S1241, S1242).

When logged measurement is reported, the eNB may record/store the logged measurement in the TCE.

After the validity timer expires, that is, after the logging duration elapses, if the UE has logged measurement that has not yet been reported, the UE performs a procedure for reporting the logged measurement to the eNB. A phase in which an overall procedure for reporting the logged measurement is called a post-reporting phase.

After the logging duration is terminated, the UE discards the logged measurement configuration and starts a conservation timer. After the logging duration is terminated, the UE stops MDT measurement. However, already logged measurement remains without being discarded. The conservation timer is indicative of the lifespan of the remaining logged measurement.

When the UE enters the RRC connection state before the conservation timer expires (S1251), the UE may report not-reported logged measurement to the eNB. In such a case, the aforementioned procedure for a logged measurement report may be performed (S1252, S1253, and S1254). If the conservation timer expires, the remaining logged measurement may be discarded. When logged measurement is reported, the eNB may record/store the logged measurement in the TCE.

The conservation timer may be fixed to a value predetermined in the UE, and may be previously set in the UE. For example, the value of the conservation timer may be 48 hours. Alternatively, the value of the conservation timer may be included in a logged measurement configuration and transferred to the UE, or may be included in another RRC message and transferred to the UE.

Meanwhile, when a new logged measurement configuration is transferred to the UE, the UE may update an existing logged measurement configuration with a newly obtained logged measurement configuration. In such a case, the validity timer may be started again from a time point at which a logged measurement configuration is newly received. Furthermore, logged measurement based on a previous logged measurement configuration may be discarded.

Figure 16:
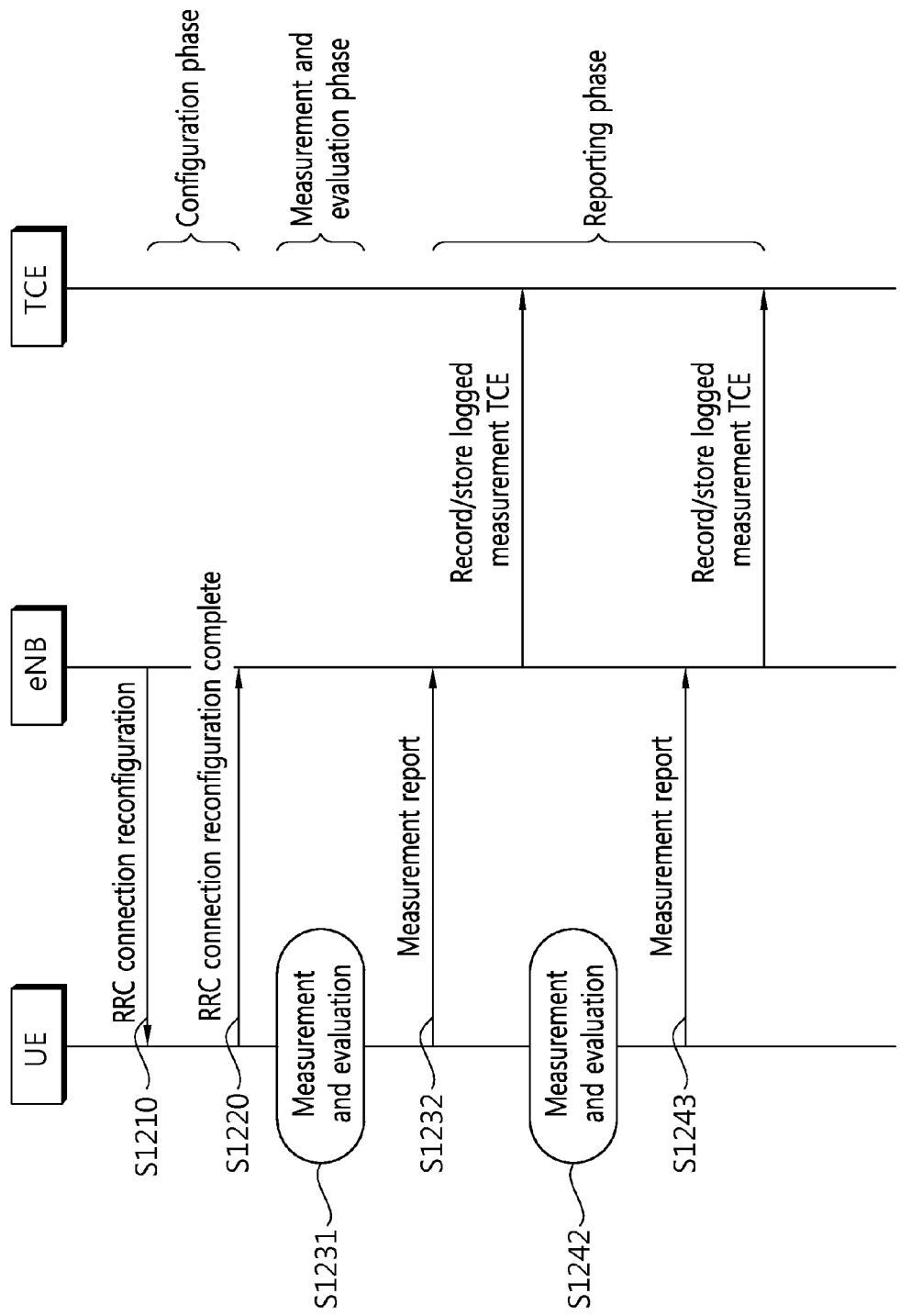
FIG. 16 is a diagram illustrating an example of an immediate MDT.

FIG. 16 is a diagram illustrating an example of an immediate MDT. The immediate MDT is based on a Radio Resource Management (RRM) measurement and report mechanism. When a measurement report is made, information related to the location is additionally added to the immediate MDT and reported to an eNB.

Referring to FIG. 16, UE receives an RRC connection reconfiguration message (S1610), and sends an RRC connection reconfiguration complete message (S1620). Accordingly, the UE enters the RRC connection state. The UE may receive a measurement configuration by receiving the RRC connection reconfiguration message. In the example of FIG. 16, the measurement configuration is received through the RRC connection reconfiguration message, but may be included in another RRC message and transmitted.

The UE performs measurement and evaluation in the RRC connection state (S1631), and reports measured results to an eNB (S1632). In the immediate MDT, the measured results may provide precise location information as in the example of Global Navigation Satellite System (GNSS) location information if possible. For location measurement, such as fingerprint, the measured results may provide neighbor cell measurement information that may be used to determine the location of the UE.

From FIG. 16, it may be seen that even after the measurement and evaluation (S1631) and report (S1632) that are first performed, the UE reports the measured results to the eNB (S1643) right after performing measurement and evaluation (S1642). This is the greatest difference between the logged MDT and the immediate MDT.

The aforementioned RLF report and accessibility measurement may be considered to be part of the MDT. Positioning is described below.

A positioning function provides means for determining the geographical location and/or speed of UE based on the measurement of a radio signal. Location information may be requested by a client (e.g., an application) with which UE is combined or a client that is present in a core network or attached to the core network, and may be reported to the client. The location information is reported according to a standard format, and may be implemented based on a cell or as geographical coordinates along with the estimated error (uncertainty) of the location and speed of the UE and, if possible, a location method (or a list of methods) used to obtain location estimation.

Most of activated or deactivated UEs within a network may use a LoCation Service (LCS) characteristic without compromising the wireless transmission or signaling capabilities of an E-UTRAN.

The uncertainty of location information depends on a method used, the location of UE within a coverage area, and a movement of the UE. Various design options (e.g., the size of a cell, an adjustable antenna technology, path loss estimates, timing accuracy, and eNB surveys) of an E-UTRAN system enable a network operator to provide a UE positioning method that is suitable for the market and that is cost-effective.

Various use examples for positioning information are present. Positioning functions may be used by an EPS internally, value-added network services, UE itself, or third-party service over a network. The functions may also be used by essential or additional emergence services. Location service may not be exclusively assigned for the location service.

Positioning methods supported in an E-UTRAN may include a network-supported GNSS method, a downlink positioning method, an enhanced cell identity (ID) (E-CID) method, and an uplink positioning method. A hybrid positioning method to which one or more of the aforementioned methods are applied at the same time is also possible.

The network-supported GNSS method is based on UE equipped with a wireless receiver capable of receiving GNSS signals. The GNSS includes a Global Positioning System (GPS), Galileo, a global navigation satellite system (GLONASS), Space Based Augmentation Systems (SBAS), and a Quasi Zenith Satellite System (QZSS). In accordance with the network-supported GNSS method, different GNSSs may be individually used to determine the location of UE, or at least one system may be combined and used.

The downlink positioning method also called Observed Time Difference of Arrival (OTDOA) is based on the measured timing of downlink signals transmitted from a plurality of eNBs to UE. The UE measures the timing of the received signals using assistance data received from a positioning server. The measured results are used to determine the location of the UE in relation to neighboring eNBs.

In the cell identity (CID) positioning method, the location of UE is estimated based on the knowledgement of the serving eNB and serving cell of the UE. Information about the serving eNB and the serving cell may be obtained by paging, the update of a tracking area, or other methods. The E-CID positioning method means a technology that uses measurements different from those of additional UE and/or E-UTRAN radio resources in order to improve UE location estimation.

Although the E-CID positioning method uses some identical measurement as in a measurement control system on the RRC protocol, UE is not expected to perform additional measurement for only positioning. For example, a separate measurement configuration or measurement control message is not provided for positioning, and the UE is not requested to take an additional measurement action, but reports its own valid measurement.

The uplink positioning method also called Uplink Time Difference OF Arrival (UTDOA) is based on measurement timing in a plurality of Location Measurement Units (LMUs) for an uplink signal transmitted by UE. The LMU measures signal reception timing using assistance data received from a positioning server, the measured results are used to estimate the location of the UE.

Figure 17:
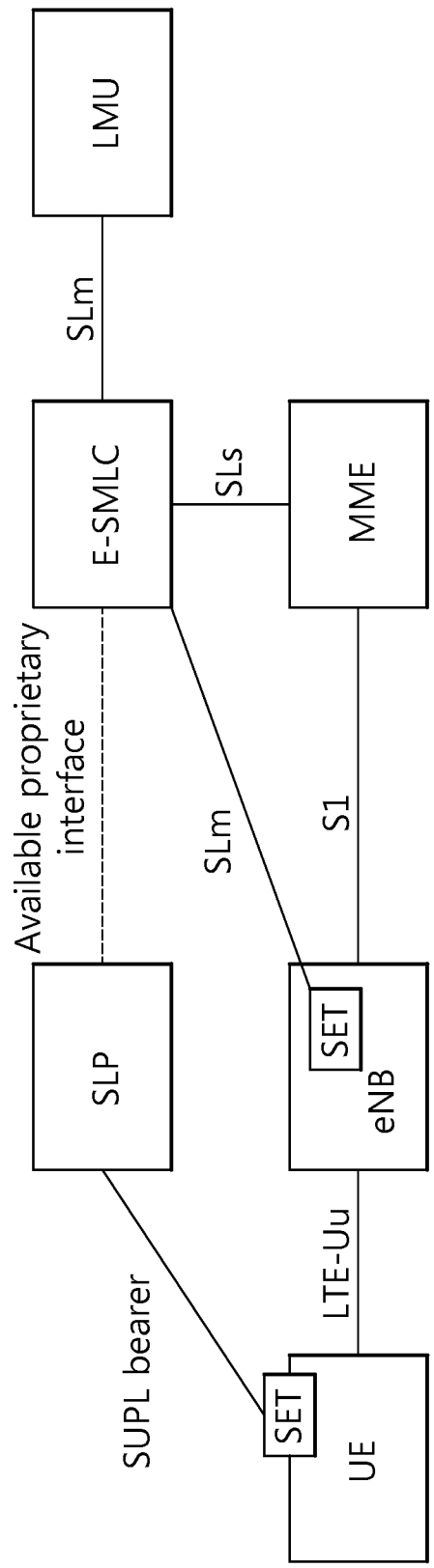
FIG. 17 is a diagram illustrating an example of the structure of a wireless communication system to which the positioning of UE is applied according to an embodiment of the present invention.

FIG. 17 is a diagram illustrating an example of the structure of a wireless communication system to which the positioning of UE is applied according to an embodiment of the present invention.

An MME may receive a request for location service related to a specific target UE from a specific entity (e.g., a Global Mobile Location Center (GMLC) or UE). Furthermore, for purposes, such as an IP Multimedia Subsystem (IMS) emergency call from a UE, the MME may determine to initiate location service for a specific target UE. Accordingly, the MME sends a location service request to an Evolved-Service Mobile Location Center (E-SMLC).

The E-SMLC processes the location service request. The E-SMLC may transfer assistance data to the target UE in order to help UE-based and/or UE support positioning. The E-SMLC may perform the positioning of the target UE. In processing location service according to an uplink method, the E-SMLC may transfer configuration data to selected Location Measurement Units (LMUs). Accordingly, the E-SMLC may return the results of the location service to the MME. Meanwhile, if the location service is requested by another entity (the UE or the E-SMLC) not the MME, the MME may return the results to a corresponding entity.

A SUPL Location Platform (SLP) is a Secure User Plane Location (SUPL) entity responsible for positioning on the user plane.

Location-related functions are provided in order to support the positioning of a target UE and the transfer of location assistance data to the UE. Such functions may be properly distributed within a structure, such as that of FIG. 17, and may be implemented. Meanwhile, reference to FIG. 18 may be made for operations related to location service that may be performed between such entities.

Figure 18:
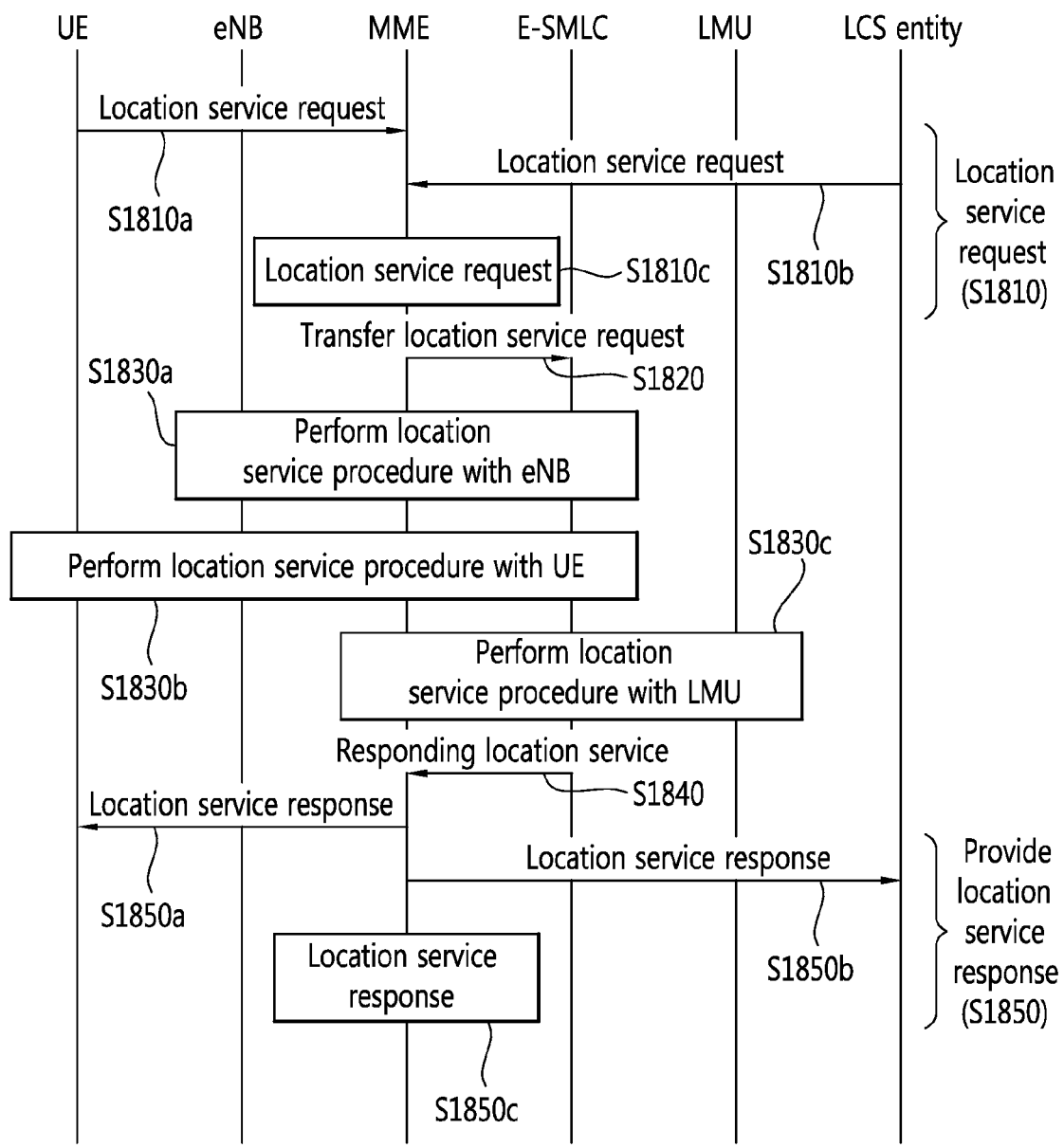
FIG. 18 is a diagram illustrating overall procedures for location service according to an embodiment of the present invention.

FIG. 18 is a diagram illustrating overall procedures for location service according to an embodiment of the present invention.

If an MME receives a location service request when UE is in the ECM-IDLE state, the MME establishes signaling connection with the UE, and performs a network triggering service request in order to assign a specific eNB. It is assumed that the UE enters a connection state before the overall procedures illustrated in FIG. 18 are started.

Location service is started in response to a location service request from a specific entity (S1810). The location service request may be started as follows.

The UE may request location service (e.g., positioning or the transfer of assistance data) from a serving MME on an NAS level (S1810a). A specific entity within an Evolved Packet Core (EPC), such as a GMLC, may request location service (e.g., positioning) for the target UE from the serving MME (S1810b). The serving MME for the target UE may determine whether or not the location service is necessary, and may autonomously request the location service if the location service is necessary (S1810c). This may be for placing the UE at a specific location or for an emergency call.

The MME transfers the location service request to an E-SMLC (S1820).

The E-SMLC performs a location service procedure in response to the location service request (S1830). The E-SMLC may perform the location service procedure along with the serving eNB of the UE (S1830a). This may include obtaining positioning measurement or assistance data. For downlink positioning, the E-SMLC may perform the location service procedure along with the UE (S1830b) along with S1830a or instead of S1830a. This may include obtaining location estimation or positioning measurement or transferring location assistance data to the UE. For uplink positioning (e.g., UTDOA), the E-SMLC may perform the location service procedure along with one or more LMUs for the target UE (S1830c) along with S1830a. This may include obtaining positioning measurement.

The E-SMLC provides the MME with a location service response (S1840). The location service response may include required results. For example, an indicator indicative of a success or failure and/or location estimation for the UE may be included.

The location service response is provided to the entity that has requested the location service (S1850). If the location service request is started by the UE as in S1810a, the MME may transfer the location service response to the UE (S1850a). In such a case, the location service response may include results that have been requested or are required like the location estimation of the UE. If the location service request is started by a specific entity within the EPC as in S1810b, the MME may transfer the location service response to the corresponding entity (S1850b). In such a case, the location service response may include results that have been requested or are required like the location estimation of the UE. If the location service request is autonomously started by the MME as in S1810c, the location service response received from the E-SMLC may be used for the location service (S1850c).

A positioning operation in a wireless communication system is described below.

Unlike in location service support for specific UEs, an E-SMLC may interact with elements within an E-UTRAN in order to obtain measurement information which supports one or more positioning methods for all UEs.

Support of a downlink positioning method: an E-SMLC may obtain location-related information in order to support a downlink positioning method. To this end, the E-SMLC may interact with an eNB accessible to the MME that has been signaling-connected to the E-SMLC. The location-related information may include an absolute GNSS time or timing information about the eNB related to the timing of other eNBs. Furthermore, the information may include information about supported cells, and may include a Positioning Reference Signal (PRS) schedule, for example. Signaling access between the E-SMLC and the eNB may be performed through the MME that maintains signaling access to the E-SMLC and the eNB.

Support of an uplink location method: the E-SMLC may interact with the serving eNB of a target UE in order to recover configuration information about the target UE for supporting an uplink positioning method. The configuration information may include information requested by an LMU in order to support uplink time measurement. The E-SMLC may inform the serving eNB that it is necessary to send an SRS signal to the UE for uplink positioning. If requested resources are not available, the eNB may assign other resources and reports the assigned resources to the E-SMLC. Furthermore, the E-SMLC may request the LMU to perform uplink time measurement and to report measured results thereof.

The operations of entities related to UE positioning in a wireless communication system are described in detail below.

The UE may send a signal necessary for uplink-based UE location measurement. Furthermore, the UE may measure downlink signals from other resources, such as an E-UTRAN and other GNSS systems. A measurement method may be determined based on a selected positioning method.

The UE may include a location service application, or may access a location service application through communication with a network or another application included in the UE. The location service application includes a measurement and calculation function that is required to determine the location of the UE along with the support of a required network or without the support of a network.

For example, the UE may include an independent positioning function (e.g., GPSs), and may report results thereof independently from the transmission of an E-UTRAN. The UE equipped with the independent positioning function may use support information obtained by a network.

The eNB is an element of an E-UTRAN that provides measured results for location estimation, and may measure a radio signal for target UE and send the measurement to an E-SMLC. The eNB may perform measurement in response to a request, or may perform measurement and a report regularly or when a specific wireless state is changed. The eNB may configure the UE so that the UE sends a periodic SRS.

The E-SMLC manages the support of location service for target UE, and the management includes the positioning of the UE and the transfer of assistance data to the UE. The E-SMLC may interact with the serving eNB of the UE in order to obtain location measurement for the UE. The measurement includes uplink measurement by an eNB and downlink measurement by UE. From among them, the downlink measurement by the UE may be provided to an eNB through another function, such as the support of handover. In order to enable an uplink positioning method and for an LMU to obtain target UE configuration data required to compute the timing of a signal, the E-SMLC may interface with an eNB in order to instruct the serving eNB that the UE is required to send an SRS signal. The E-SMLC may select a set of LMUs used for UTDOA positioning. The E-SMLC may interact with selected LMUs in order to request timing measurement. If there is a request, the E-SMLC may interact with the target UE in order to transfer assistance data or obtain location estimation.

For the positioning of the target UE, the E-SMLC may determine a positioning method that will be used based on factors, including an LCS client type, required QoS, UE positioning capabilities, and the positioning capabilities of an eNB. Accordingly, the E-SMLC may apply the positioning method to the UE and/or the serving eNB. The positioning method includes location estimation for a UE-based positioning method and/or location measurement for a UE support and network-based positioning method. The E-SMLC may combine all received results, and may determine single location estimation for target UE. Supplementary information, such as the accuracy and speed of location estimation may also be determined.

An LMU performs measurement and transfers measured results to an E-SMLC. All types of location measurement obtained by the LMU may be provided to the E-SMLC. A UE positioning request may be accompanied by measurement performed by a plurality of LMUs.

If UE reports information about the location of unrestricted coverage although location information desired to be collected by a network is restricted to a specific time zone or a specific network area, the network receives excessively obtained location information, thereby increasing overhead. Furthermore, there may be a problem in that power is unnecessarily consumed because UE performs positioning in order to obtain location information having a low importance. In a current wireless communication system, however, there is no method of restricting the positioning of UE to the time or a network area intended by a network.

The present invention proposes a report method based on a scheme for restricting the positioning of UE so that information about a restricted location desired to be collected by a network can be collected.

Figure 19:
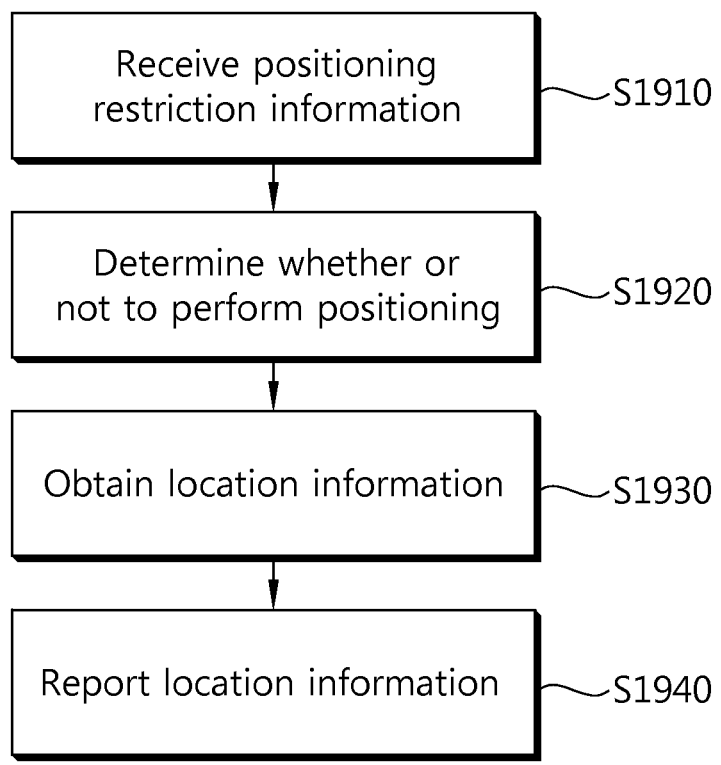
FIG. 19 is a diagram illustrating a report method based on positioning restriction according to an embodiment of the present invention.

FIG. 19 is a diagram illustrating a report method based on positioning restriction according to an embodiment of the present invention.

Referring to FIG. 19, UE receives positioning restriction information from a network (S1910), determines whether or not to perform positioning at a specific time interval and/or in a specific area based on the positioning restriction information (S1920), obtains information about the location of the corresponding coverage if the positioning is permitted (S1930), and reports the obtained location information to the network (S1940).

The positioning restriction information may be explicitly configured for the UE independently of other pieces of configuration information. That is, the positioning restriction information may be signaled to the UE as information independent from other pieces of configuration information. The positioning restriction information may be signaled to the UE along with information related to the measurement of a measurement configuration. The positioning restriction information may be signaled to the UE along with information related to the logged MDT of a logged measurement configuration.

The positioning restriction information may be implicitly configured when other pieces of configuration information are configured for the UE. For example, if information that restricts the logging area of a logged MDT is configured for UE along with a logged measurement configuration, the UE may consider the logging area restriction information of the logged MDT to be area information for positioning restriction. Furthermore, logging duration of an logged MDT included in a logged measurement configuration may be considered to be time information for positioning restriction.

The validity of positioning restriction information may depend on information about the configuration of a configuration message that is transmitted along with positioning information. For example, in a logged MDT, if positioning restriction information is included in a logged measurement configuration and transmitted, the validity of the positioning information may depend on the validity timer of the logged measurement configuration. Furthermore, if positioning information is included in a measurement configuration and transmitted, the validity of the positioning information may depend on the validity of the measurement configuration. In the case of an immediate MDT, if UE has moved to a cell through cell reselection and/or handover, positioning restriction information may be no longer valid because measurement configuration is no longer valid. In this case, if the positioning restriction information is transmitted or has been transmitted through a message that is independently signaled or if information related to the validity of the positioning restriction information is transmitted along with the message, the validity of the positioning restriction information may be implemented to be valid for a time interval indicated by validity-related information and/or for a specific time interval previously set by UE.

Positioning restriction may be positioning information that restricts UE so that the UE performs positioning for a specific time interval only. If the positioning is restricted to the specific time interval, positioning restriction information may be implemented to be indicative of the specific time interval.

The time information may include only the specific time interval. In such a case, when the time information is received, the UE starts a restriction timer set to the specific time interval. The UE obtains location information by performing positioning while the restriction timer is being driven.

The time information may include a start time point and an end time point. In such a case, UE may start positioning at the start time, and may continue performing the positioning until the end time.

Positioning restriction may be positioning information that restricts UE so that the UE performs positioning only in a specific network area. If the positioning is restricted to the specific network area, positioning restriction information may be implemented to be indicative of the specific network area.

Specific network area information may be a cell identity list. In such a case, UE may obtain location information by performing positioning only if a serving cell is now included in the cell identity list.

Specific network area information may be a frequency list. In such a case, UE may obtain location information by performing positioning only if a serving cell is now included in the frequency list.

Specific network area information may be a Tracking Area Code (TAC) or Tracking Area Identity (TAI) list. In this case, the TAI is an identifier that includes a Mobile Country Code (MCC), a Mobile Network Code (MNC), and a TAC. In such a case, UE may obtain location information by performing positioning only if a tracking area to which a serving cell now belongs is included in the received TAC/TAI list.

Specific network area information may be a PLMN ID list. In such a case, UE may obtain location information by performing positioning only if a PLMN to which a serving cell now belongs is included in the PLMN ID list.

Specific network area information may be a specific RAT indicator. In such a case, UE may obtain location information by performing positioning only if a serving RAT is now a specific RAT.

Meanwhile, specific network area information may be a combination of pieces of network region information, such as that described above.

In the case where a network has sent positioning restriction information that restricts positioning, performed by UE in the RRC connection state, to the UE, if the UE performs handover to another cell, a source cell may forward the positioning restriction information to a target cell. The target cell may reconfigure positioning restriction information suitable for the UE based on the received positioning restriction information, and may provide the reconfigured positioning restriction information to the UE. In such a case, the reconfigured positioning restriction information may be provided to the UE through a handover command or through signaling after the handover is completed. If the positioning restriction information transmitted from the source cell to the target cell is positioning restriction according to a time interval, the source cell may provide the UE with information indicative of the remaining time for the positioning.

Figure 20:
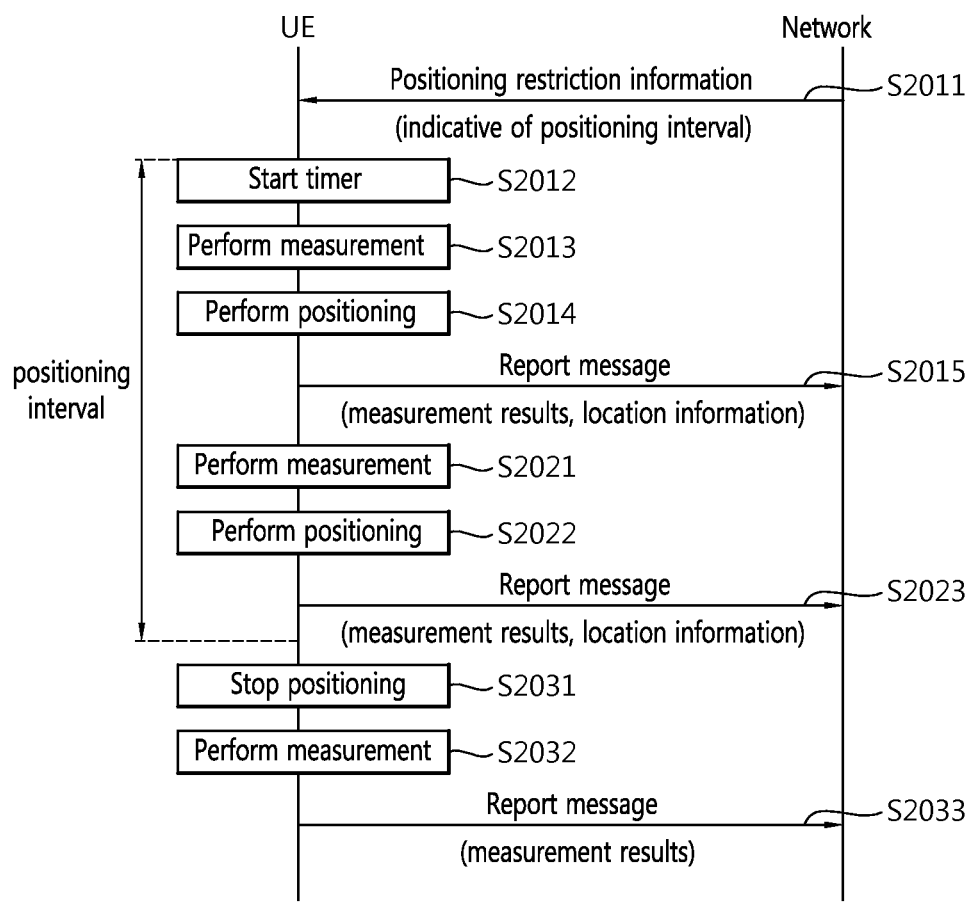
FIG. 20 is a flowchart illustrating an example of a report method based on restricted positioning according to an embodiment of the present invention.

FIG. 20 is a flowchart illustrating an example of a report method based on restricted positioning according to an embodiment of the present invention. The example of FIG. 20 illustrates a case where a time interval in which positioning is performed is restricted in the case where a network restricts the positioning of UE.

Referring to FIG. 20, UE receives positioning restriction information from a network (S2011). The positioning restriction information may be indicative of an interval in which the UE is able to perform positioning. In this example, it is assumed that the positioning restriction information is indicative of the temporal length of the positioning interval. The positioning restriction information may be included in a measurement configuration message configured by the network so that the UE reports measured results, and may be then transmitted.

When the positioning restriction information is received from the network, the UE starts a restriction timer for a positioning execution time (S2012). The UE may determine that positioning for obtaining location information related to measured results has been permitted while the restriction timer is being driven.

The UE performs measurement on a serving cell and/or at least one neighbor cell (S2013), and performs positioning in order to obtain location information related to obtained measured results (S2014).

The UE sends a report message, including the measured results and the location information, to the network (S2015).

The UE may determine that positioning has been permitted because the restriction timer related to positioning restriction is being driven even after sending the report message. Accordingly, the UE performs measurement on the serving cell and/or at least one neighbor cell (S2021), and performs positioning in order to obtain location information related to obtained measured results (S2022).

The UE sends a report message, including the measured results and the location information, to the network (S2023).

When the restriction timer related to the positioning restriction expires, the UE may determine that positioning is not permitted. Accordingly, the UE stops performing the positioning (S2031).

The UE performs measurement on the serving cell and/or at least one neighbor cell (S2032), and sends a report message including measured results to the network (S2033).

Figure 21:
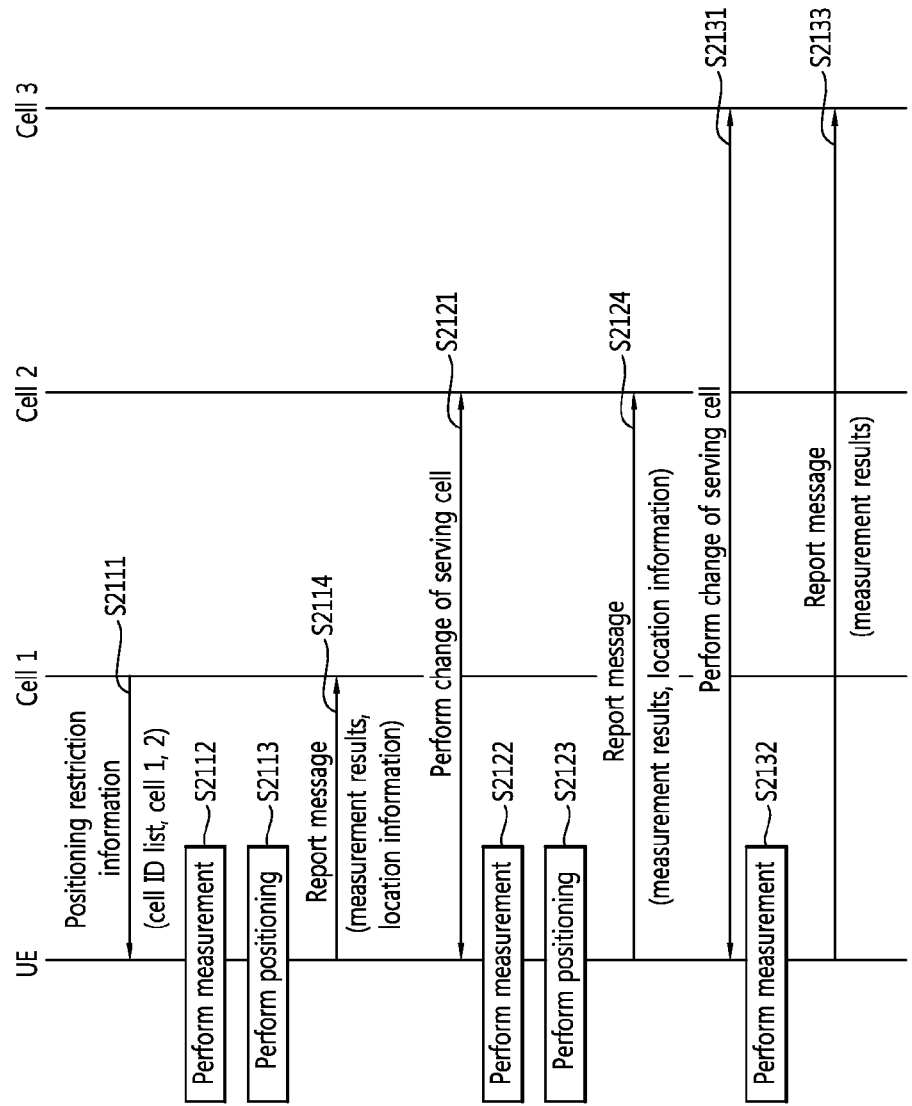
FIG. 21 is a flowchart illustrating another example of a report method based on restricted positioning according to an embodiment of the present invention.

FIG. 21 is a flowchart illustrating another example of a report method based on restricted positioning according to an embodiment of the present invention. The example of FIG. 21 illustrates a case where coverage where positioning is permitted is restricted in the case where a network restricts the positioning of UE.

Referring to FIG. 21, UE receives positioning restriction information from a cell 1 (S2111). The positioning restriction information may be indicative of coverage where the UE may perform positioning. More specifically, a network may send the positioning restriction information, including a list of cells in which the positioning of the UE is permitted, to the UE. In this example, it is assumed that the positioning restriction information includes a cell list indicative of the cell 1 and a cell 2. The positioning restriction information may be included in a measurement configuration message configured by the network so that the UE reports measured results, and may be transmitted.

The UE performs measurement on a serving cell and/or at least one cell (S2112).

The UE may determine that the execution of positioning has been permitted because a serving cell is now the cell 1 and the corresponding cell is a serving cell in which positioning has been permitted. Accordingly, the UE performs positioning in order to obtain location information related to measured results (S2113).

The UE sends a report message, including the measured results and the location information, to the network (S2114).

Thereafter, the UE performs a change of the serving cell to the cell 2 (S2121). The change of the serving cell of the UE may be handover performed in the RRC connection state or cell reselection performed in the RRC idle state.

The UE performs measurement on the serving cell and/or at least one cell (S2122).

The UE may determine that the execution of positioning has been permitted because a serving cell is now the cell 2 and the corresponding cell is a serving cell in which positioning has been permitted. Accordingly, the UE performs positioning in order to obtain location information related to measured results (S2123).

The UE sends a report message, including the measured results and the location information, to the network (S2124).

Thereafter, the UE performs a change of the serving cell to a cell 3 (S2131). The change of the serving cell of the UE may be handover performed in the RRC connection state or cell reselection performed in the RRC idle state.

The UE performs measurement on the serving cell and/or at least one cell (S2132).

Meanwhile, the UE may determine that the execution of positioning has not been permitted because the serving cell is now the cell 3 and the corresponding cell is not a serving cell in which positioning has been performed. Accordingly, the UE does not perform positioning while the UE operates using the cell 3 as a serving cell.

The UE sends a report message, including the measured results, to the network (S2133).

Meanwhile, in the example described with reference to FIG. 21, the UE has changed the serving cell through cell reselection and/or handover. In the case where positioning restriction information is included in a measurement configuration message and provided to UE, if a serving cell is changed, a problem may occur in that information related to a measurement configuration is no longer valid. Accordingly, there may be a need for a procedure for transferring positioning restriction information from a source cell to a target cell and informing UE of the corresponding information so that the UE operates based on the existing positioning restriction information even after a serving cell is changed.

Meanwhile, if positioning restriction information is included in a logged measurement configuration message for a logged MDT, whether or not positioning restriction information according to a change of the serving cell of UE is valid is not problematic because the information included in the logged measurement configuration message is valid while the validity timer of a logged measurement configuration is being driven.

Figure 22:
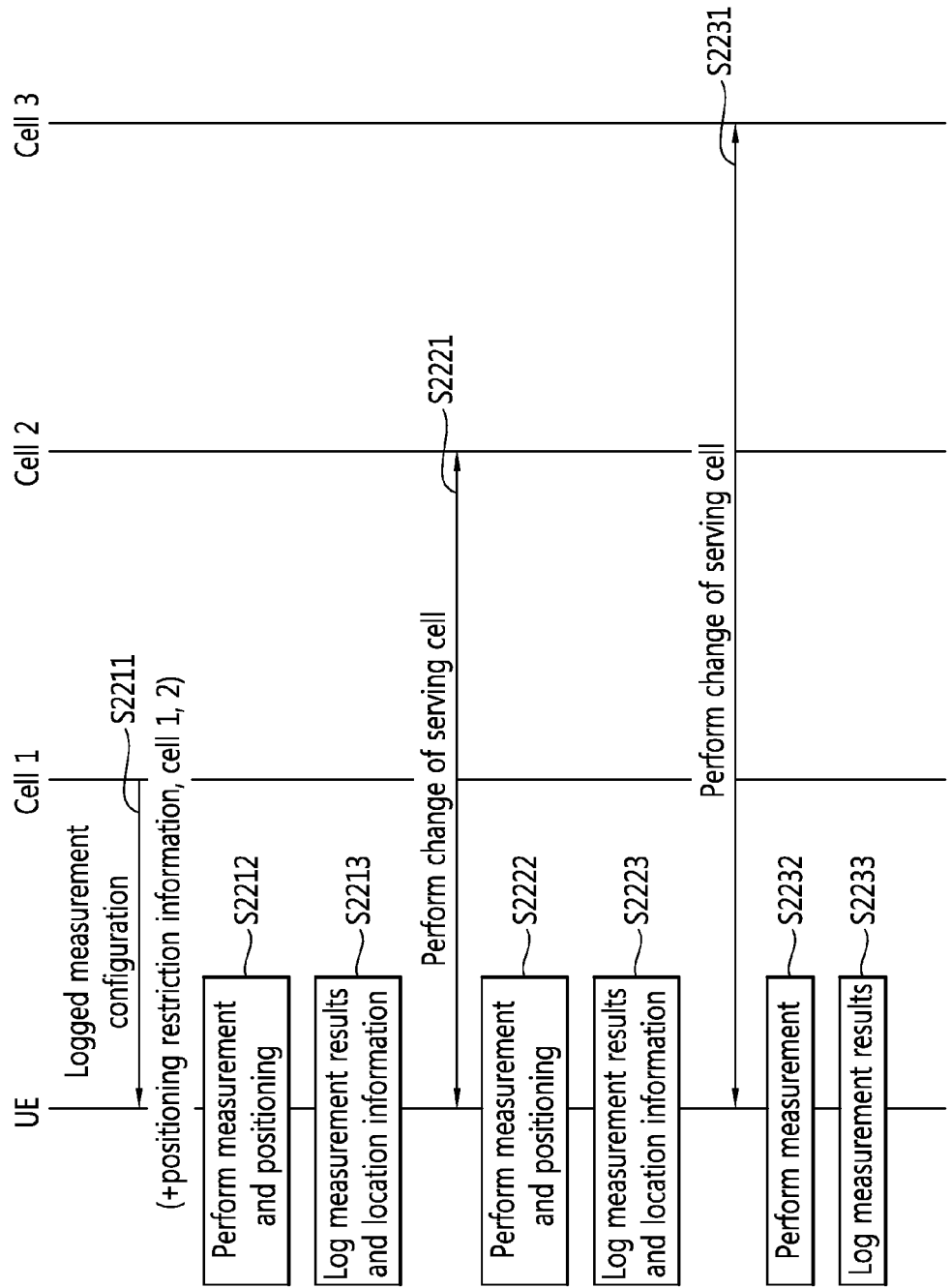
FIG. 22 is a flowchart illustrating yet another example of a report method based on restricted positioning according to an embodiment of the present invention.

FIG. 22 is a flowchart illustrating yet another example of a report method based on restricted positioning according to an embodiment of the present invention. The example of FIG. 22 illustrates a report method according to a logged MDT to which a positioning restriction scheme has been applied.

Referring to FIG. 22, UE receives a logged measurement configuration, including information for performing a logged MDT, from a cell 1 (S2211). The logged measurement configuration may include positioning restriction information, and the positioning restriction information may include a list of cells in which the positioning of the UE is performed. In this example, it is assumed that the positioning restriction information includes a cell list indicative of the cell 1 and a cell 2.

The UE may determine that positioning is permitted while the UE operates using the cell 1 as a serving cell because a serving cell is the cell 1 and the cell list included in the positioning restriction information is indicative of the cell 1. Accordingly, after entering an idle state, the UE performs measurement on a serving cell and/or at least one neighbor cell, and performs positioning in order to obtain location information related to measured results (S2212).

The UE logs the obtained measured results and location information (S2213).

When the UE (re)establishes RRC connection with the cell and enters the RRC connection state, the UE notifies the cell 1 that the logged measurement to be reported is present, and may report the logged measurement after receiving a report request from the cell 1.

Thereafter, the UE performs a change of the serving cell to the cell 2 (S2221). The change of the serving cell of the UE may be handover that is performed by the UE in the RRC connection state or cell reselection that is performed by the UE in the RRC idle state. Meanwhile, when the UE establishes RRC connection with the cell 2 and enters the RRC connection state in the state in which the UE has not reported the logged measurement to the cell 1, the UE notifies the cell 2 that the logged measurement to be reported is present, and may report the logged measurement after receiving a report request from the cell 2.

The UE may determine that positioning is permitted while the UE operates using the cell 2 as a serving cell because a serving cell is the cell 2 and the cell list included in the positioning restriction information is indicative of the cell 2. Accordingly, after entering an idle state, the UE performs measurement on a serving cell and/or at least one neighbor cell and performs positioning in order to obtain location information related to measured results (S2222).

The UE logs the obtained measured results and location information (S2223).

When the UE (re)establishes RRC connection with the cell 2 again and enters the RRC connection state, the UE notifies the cell 2 that there is logged measurement to be reported, and may report the logged measurement after receiving a report request from the cell 2.

Thereafter, the UE performs a change of the serving cell to a cell 3 (S2321). The change of the serving cell of the UE may be handover that is performed by the UE in the RRC connection state or cell reselection that is performed by the UE in the RRC idle state. Meanwhile, when the UE establishes RRC connection with the cell 3 and enters the RRC connection state in the state in which the UE has not reported the logged measurement to the cell 1, the UE notifies the cell 3 that the logged measurement to be reported is present, and may report the logged measurement after receiving a report request from the cell 3.

The UE may determine that positioning is not permitted while the UE operates using the cell 3 as a serving cell because a serving cell is the cell 2 and the cell list included in the positioning restriction information is not indicative of the cell 3. Accordingly, after entering an idle state, the UE obtains measured results by performing measurement on a serving cell and/or at least one neighbor cell, but does not perform positioning (S2232). In this example, although the positioning of UE is not permitted, the UE has performed measurement and logging based on the logged measurement configuration. However, UE may not perform measurement and logging if positioning is not permitted depending on a detailed implementation of an embodiment of the present invention. Furthermore, if whether the positioning of UE is permitted or not is determined based on logging area restriction information for a logged measurement configuration, the execution of the positioning and the execution of the measurement of UE may be performed at the same time or may not be performed at the same time because they depend on each other.

The UE logs the obtained measured results and location information (S2233).

When the UE (re)establishes RRC connection with the cell 3 again and enters the RRC connection state, the UE notifies the cell 3 that the logged measurement to be reported is present, and may report the logged measurement after receiving a report request from the cell 3.

A logged measurement configuration for a logged MDT has a position as valid information until a validity timer related to the validity of the logged measurement configuration expires. Accordingly, if UE has obtained positioning restriction information through the logged measurement configuration, the UE may obtain measured results and/or location information by performing measurement and/or positioning based on information related to the measurement and logging, included in the logged measurement configuration, and positioning restriction information if the validity timer is driven although the UE changes a serving cell through cell reselection and/or handover. As described above, if positioning restriction information is indicative of a positioning restriction area, a positioning restriction scheme may be very properly combined with a logged MDT and operated.

In accordance with an embodiment of the present invention, a network can restrict positioning so that UE performs positioning only in a specific time interval or specific network area. Accordingly, a network can obtain location information in the time and place in which location information obtained through positioning can be more usefully used. In contrast, a network can reduce overhead by restricting a report on location information in the time and area in which the importance of location information is relatively low. Through such selective collection of location information, network optimization can be more efficiently performed, and the performance of a wireless communication system can be further improved.

Figure 23:
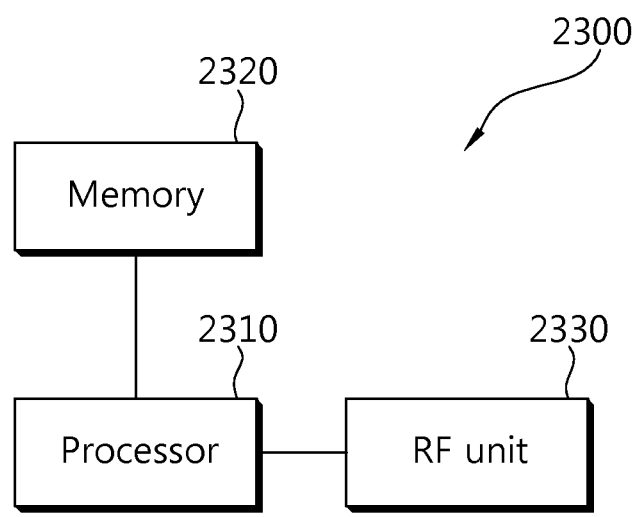
FIG. 23 is a block diagram illustrating a wireless apparatus in which an embodiment of the present invention is implemented.

FIG. 23 is a block diagram illustrating a wireless apparatus in which an embodiment of the present invention is implemented. This apparatus may implement the operations of the UE and/or the network which performs the embodiments described with reference to FIGS. 19 to 22.

The wireless apparatus 2300 includes a processor 2310, memory 2320, and a Radio Frequency (RF) unit 2330. The processor 2310 performs the proposed functions, processes and/or methods. The processor 2310 may be implemented to perform the measurement of radio resources and to obtain location information related to the measurement. The processor 2310 may be configured to receive positioning restriction information and to determine whether or not to perform positioning based on the positioning restriction information. If the execution of positioning is permitted, the processor 2310 may be configured to obtain location information. The processor 2310 may be configured to report measured results and/or obtained location information. The processor 2310 may be configured to implement the embodiments of the present invention described with reference to the drawings.

The RF unit 2330 is connected to the processor 2310, and sends and receives radio signals.

The processor 2310 and the RF unit 2330 may be implemented to send and receive radio signals according to one or more communication standards. The RF unit 2330 may include one or more transceivers capable of sending and receiving radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A report method by a user equipment in a wireless communication system, the method comprising:
    receiving a logged measurement configuration including configuration information for a logged Minimization Driving Test (MDT) and positioning restriction information from a network; and
    determining whether positioning is permitted based on the positioning restriction information,
    entering a Radio Resource Control (RRC) idle state when the positioning is permitted;
    obtaining location information by performing the positioning in the RRC idle state;
    performing a measurement on a serving cell or at least one neighbor cell based on the logged measurement configuration; and
    reporting the location information to the network.

2. The report method of claim 1, wherein the positioning restriction information is indicates a start time point and an end time point of a time interval in which the positioning of the user equipment is permitted.

3. The report method of claim 2, wherein determining whether the positioning is permitted comprises determining whether the user equipment is operating between the start time point and the end time point.

4. The report method of claim 1, wherein:
the positioning restriction information indicates a length of a time interval during which the positioning is permitted, and
the method further comprises starting a restriction timer based on the positioning restriction information.

5. The report method of claim 4, wherein determining whether the positioning is permitted comprises determining whether the restriction timer is expired.

6. The report method of claim 1, wherein the positioning restriction information is indicative of coverage in which the positioning is permitted.

7. The report method of claim 6, wherein:
the coverage in which the positioning is permitted is at least one cell, and
the positioning restriction information comprises a cell list indicative of the at least one cell.

8. The report method of claim 7, wherein determining whether the positioning is permitted comprises determining whether a serving cell of the user equipment is indicated by the cell list.

9. The report method of claim 6, wherein:
the coverage in which the positioning is permitted is at least one frequency, and
the positioning restriction information comprises a frequency list indicative of the at least one frequency.

10. The report method of claim 9, wherein determining whether the positioning is permitted comprises determining whether an operation frequency of the serving cell of the user equipment is indicated by the frequency list.

11. The report method of claim 1, further comprising:
logging the results of the measurement and the location information if the positioning is permitted,
wherein reporting the location information to the network comprises reporting a report message, comprising the logged measured results and location information, to the network.

12. The report method of claim 11, further comprising:
logging the results of the measurement if the positioning is not permitted; and
reporting the report message, comprising the logged measured results, to the network.

13. A wireless apparatus operating in a wireless communication system, the wireless apparatus comprises:
a Radio Frequency (RF) unit that sends and receives radio signals; and
a processor that is functionally coupled to the RF unit and operates,
wherein the processor is configured to:
receive a logged measurement configuration including configuration information for a logged Minimization Driving Test (MDT) and positioning restriction information from a network;
determine whether positioning is permitted based on the positioning restriction information,
enter a Radio Resource Control (RRC) idle state when the positioning is permitted;
obtain location information by performing the positioning in the RRC idle state,
perform a measurement on a serving cell or at least one neighbor cell based on the logged measurement configuration, and
report the location information to the network.

* * * * *